US012699743B2

(12) United States Patent
Zwicky et al.

(10) Patent No.: US 12,699,743 B2
(45) Date of Patent: Aug. 4, 2026

(54) SYSTEMS AND METHODS FOR ENHANCED SYSTEM RESPONSE AND ANALYSIS BASED ON ARTIFICIAL INTELLIGENCE (AI) AND REAL-TIME MENTAL STATE ANALYSES

(71) Applicants: Richard Kazimierz Zwicky, Victoria (CA); Allison Avery Moores, Rancho Santa Fe, CA (US)

(72) Inventors: Richard Kazimierz Zwicky, Victoria (CA); Allison Avery Moores, Rancho Santa Fe, CA (US)

(73) Assignee: NOVENTIO HOLDINGS INC.

( * ) Notice: Subject to any disclaimer, the term of this patent is extended or adjusted under 35 U.S.C. 154(b) by 0 days.

(21) Appl. No.: 19/383,491

(22) Filed: Nov. 7, 2025

(65) Prior Publication Data

US 2026/0134043 A1 May 14, 2026

Related U.S. Application Data

(60) Provisional application No. 63/718,503, filed on Nov. 8, 2024.

(51) Int. Cl.
*G06F 17/00* (2019.01)
*G06F 7/00* (2006.01)
*G06F 16/9535* (2019.01)
*G06F 16/9538* (2019.01)

(52) U.S. Cl.
CPC ...... *G06F 16/9535* (2019.01); *G06F 16/9538* (2019.01)

(58) Field of Classification Search
CPC .......................... G06F 16/9535; G06F 16/9538

USPC .......................................................... 707/722
See application file for complete search history.

(56) References Cited

U.S. PATENT DOCUMENTS

| | | | | |
|---|---|---|---|---|
| 11,921,729 | B1 * | 3/2024 | Shan ................... | G06F 16/9537 |
| 2013/0137464 | A1 * | 5/2013 | Kramer .............. | G06Q 30/0225 |
| | | | | 455/456.3 |
| 2016/0046298 | A1 * | 2/2016 | DeRuyck .............. | B60W 40/09 |
| | | | | 340/576 |
| 2016/0261465 | A1 * | 9/2016 | Gupta .................... | H04L 43/04 |

(Continued)

*Primary Examiner* — Pavan Mamillapalli
(74) *Attorney, Agent, or Firm* — Knobbe, Martens, Olson & Bear, LLP

(57) ABSTRACT

Systems and methods for enhanced system response and analysis based on artificial intelligence (AI) and real-time mental state analyses. An example method includes receiving a request associated with a user, the request being received from a subscriber system, with an individual subscriber system being associated with a back-end of a first application or web service executing on a user device, and with the request being indicative of a request for behavioral response information. A user profile indicative of the user's mental state is accessed, the user profile aggregating disparate historical information associated with the user, and the user profile being clustered within a multi-dimensional feature space. Real-time information is aggregated within a threshold window of time, the real-time information being obtained via a second application executing on the user device, the second application analyzing data derived from sensors and/or user interactions with the user device, and the second application forming the real-time information based on the analyses. The request is responded to based on the user profile and real-time information.

22 Claims, 11 Drawing Sheets

(56) References Cited

U.S. PATENT DOCUMENTS

| | | | |
|---|---|---|---|
| 2019/0122093 A1* | 4/2019 | Yonekura | G06F 16/90332 |
| 2022/0187902 A1* | 6/2022 | Baughman | G06F 3/011 |
| 2023/0214925 A1* | 7/2023 | Cella | G06Q 30/06 |
| | | | 705/37 |
| 2024/0031367 A1* | 1/2024 | Pringle | H04L 63/10 |

* cited by examiner

Obtain information from, at least, disparate user device(s)

504

Extract features / metric information

506

Form user profile based on clustering

508

Adjust user profile based on updated information

SYSTEMS AND METHODS FOR ENHANCED SYSTEM RESPONSE AND ANALYSIS BASED ON ARTIFICIAL INTELLIGENCE (AI) AND REAL-TIME MENTAL STATE ANALYSES

CROSS-REFERENCE TO RELATED APPLICATIONS

This application claims priority to U.S. Prov. Patent App. No. 63/718,503 titled "SYSTEMS AND METHODS FOR BEHAVIORAL TARGETING AND ENHANCED ANALYSES BASED ON MENTAL STATE" and filed on Nov. 8, 2024, the disclosure of which is hereby incorporated herein by reference in its entirety.

BACKGROUND

Content may be served to users of a web application or website based on known preferences of a user. For example, known preferences may be based on a browsing history of the user or based on information derived from cookies stored via a user device of the user.

SUMMARY

In some embodiments, a method, system, and computer readable media are described. An example method is implemented by a system of one or more computers, the method comprising: receiving, via the system, a request associated with a user, the request being received from a subscriber system of a plurality of subscriber systems, wherein an individual subscriber system is associated with a back-end of a first application or web service executing on a user device of one or more user devices associated with the user, and wherein the request is indicative of a request for behavioral response information; accessing a user profile indicative of the user's mental state, the user profile aggregating disparate historical information associated with the user, and the user profile being clustered within a multi-dimensional feature space; triggering aggregation of real-time information within a threshold window of time, the real-time information being obtained, at least, via a second application executing on the user device, the second application analyzing data derived from sensors and/or user interactions with the user device, and the second application forming the real-time information based on the analyses; and responding to the request based on the user profile and real-time information, and wherein the response is configured to inform presentation of information via the first application or web service.

In some embodiments, a method, system, and computer readable media are described. An example method is implemented by a user device of one or more processors, the method comprising: receiving, at the user device, a request associated with a mental state of a user from a subscriber component associated with a first application executing on the user device or from a back-end associated with the first application; accessing, on the user device, a user profile indicative of the user's mental state, the user profile aggregating disparate historical information associated with the user and clustered within a multi-dimensional feature space; obtaining, within a threshold time period and in response to the request, current information on the user device, the current information being derived from sensors and/or user interactions on the user device and formed by analysis performed by the application or the operating-system services; and forming, on the user device, and providing a response based on the user profile and the current information, the response being configured to inform presentation of information via the first application and being transmittable to at least one of the first application.

In some embodiments, a method, system, and computer readable media are described. An example method is performed by one or more processors of a user device associated with a user, the method comprising: receiving, at the user device via an operating-system mediated interface, a request associated with the user, the request being received from a subscriber component associated with a client application executing on the user device or from a back-end associated with the client application, the request being indicative of behavioral response information; accessing, at the user device, a user profile indicative of the user's mental state, the user profile aggregating disparate historical information associated with the user and being positioned within a multi-dimensional feature space; triggering, at the user device, aggregation of real-time information within a threshold window of time, the real-time information being obtained via operating-system services by a second application or library executing on the user device that analyzes data derived from sensors and/or user interactions with the user device and forms the real-time information based on the analyses; and responding to the request by generating, on the user device, a response based on the user profile and the real-time information, the response being configured to inform presentation of information via the client application, wherein the response is routed to the client application or to the back-end associated with the client application.

BRIEF DESCRIPTION OF THE DRAWINGS

FIG. 3E is another example user interface associated with communication with an LLM or other system.

Figure 1A:
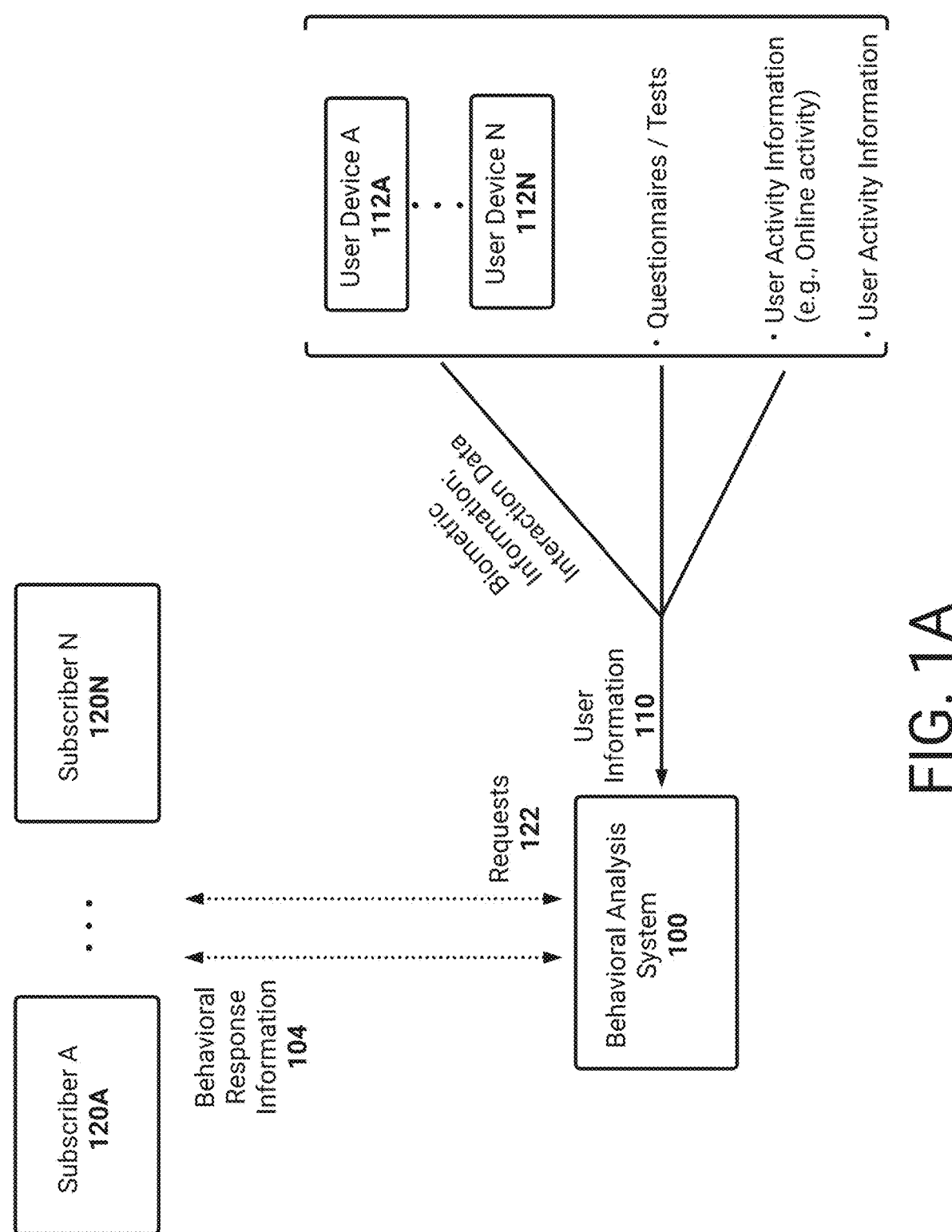
FIG. 1A illustrates a block diagram of an example behavioral analysis system in communication with user device(s) and subscriber(s).

Embodiments of the present disclosure and their advantages are best understood by referring to the detailed description that follows. It should be appreciated that the figures are for purposes of illustrating embodiments of the present disclosure and not for purposes of limiting the same.

DETAILED DESCRIPTION

This application describes techniques for behavioral targeting which leverage disparate user information usable to form an overall model associated with predictive behavior of a user. The disclosed technology obtains data from a multitude of sources, such as biometric information from user devices of the user, user responses to questionnaires, monitored user activity with respect to user devices, the Internet, and so on. This disparate information may inform a mental state of the user, such as reflecting the user's physiological states and personality. Advantageously, the techniques described herein may provide an enhanced user experience with respect to arbitrary applications, software end points, software-controlled systems, and so on, which are being utilized by the user. For example, prior techniques may statically build the user's likes based on limited information derived from cookies. In contrast, the disclosed technology enables a holistic view of the user's personality, which as described below, may be adjusted based on real-time data to adapt application functionality to the user's real-time personality (e.g., the user's current mental state).

As will be described, the disclosed technology may enable a system (e.g., the behavioral analysis system 100) to respond to requests associated with the user (e.g., via an application programming interface or endpoint call). In some embodiments, the requests may be received from outside systems which subscribe to, or otherwise receive, information from the system. The system may respond to the requests based on the model, which may, in some embodiments, describe a user profile (e.g., a historical) profile associated with the user. The user profile may be clustered within a learned multi-dimensional feature or vector space. Thus, the user profile may be analyzed in comparison with user profiles of other users.

Advantageously, the system may combine, or perturb, the user profile based on real-time information aggregated from user devices of the user. As an example, the real-time information may reflect that the user has adjusted his/her typical user input patterns within a prior window of time (e.g., the user may be more aggressively typing or interacting with a touch screen). The real-time information may additionally reflect that the user is in a crowded space based on monitoring wireless endpoints of devices proximate to the user (e.g., based on Bluetooth low energy, ultra-wideband, and so on).

In this way, the system may enable substantially real-time determinations of the user's mental state. Thus, for example, the system may rapidly indicate whether, for example, the user is currently stressed, happy, and so on.

As one example, the system may respond to an outside system with information reflective of the user's mental state. The outside system may use the information to take a particular action, adjust a current action, and so on. For example, the outside system may modify content items which are being provided to the user. As another example, the outside system may select a particular content item (e.g., video, music, and so on) based on the user's mental state. As another example, the outside system may automatically present certain information. For example, the user may be interacting with a point-of-sale system. In this example, the point-of-sale system may have, or receive, information reflecting a typical order associated with the user. The point-of-sale system, based on the user's mental state, may instead present an adjusted order more congruent with the user's current mental state.

In some embodiments, the disclosed technology enables the creation of an automated feedback processes, which may be used to adjust the responses of autonomous devices to optimize a user experience, provide a seamless interaction with technology, or provide routings and paths to a destination, whether virtual or real-world.

For example, a vehicle which includes the user may be navigating along a route. For this example, the vehicle may be autonomously following the route, or the user may be driving the vehicle along the route. The system may determine that the user is stressed or experiencing a heightened emotional state. As an example, the system may obtain biometric readings associated with the user (e.g., based on the user's wearable device, based on image sensors included in the vehicle, and so on). The vehicle, or a navigation application, may request information reflective of the user's emotional state (herein referred to as user information), and automatically effectuate updates to the route. For example, the vehicle, or the navigation application, may determine that the user is stressed. In this example, the route may be updated, or initially selected, to reduce the stress associated with the user. As an example, the route may avoid traffic (e.g., even at the expense of time), may avoid locations known to trigger stress for the user, and so on.

In some embodiments, the disclosed technology permits the creation of automated processes which may be used to adjust the content served to an individual based on the individual's mental state, sentiment, or expected response to forecast stimuli. For example, the above-described content items (e.g., advertisements, music, video, images) may be adjusted, or otherwise determined, in substantially real-time. In this way, an entity acquiring advertisements may avoid having their advertisements served to users in unresponsive mental states.

With respect to the above, the processes may be based on a user's current or historical physiological state, mental state, and/or the state of associated individuals present or traveling with them. The decisions can be made automatically based on an individual's profile, or Internet wide based on individual and global trends, and usage patterns.

The techniques described herein may aggregate, or otherwise analyze, activities, responses to prior situations, behavioral profiles, and so on, which are collected from multiple data sources. The system may include the collected information in one or more databases, log files, and so on, which are accessible to the system. As will be described, the system may generate responses, such as recommendations, reports, and so on, to individual outside systems (e.g., subscriber systems 120A-120N) to drive highly personalized interactions. The system may also generate master/consolidated reports upon which broad-based predictive analytics tools can be created or enhanced.

While the description herein references a system, such as the behavioral analysis system 100, as may be appreciated the techniques described herein may be locally executed by a user device of a user. For example, user information may be obtained via the user device from different sources. In this example, the user device may analyze the user information to form the above-described model. Requests from outside systems may be routed, or otherwise provided to, the user device.

In some embodiments, responses based on the above-described model may mask, or otherwise not include, specific information such as emotional state, and so on. As one example, a request to the system may be provided via an application programming interface (API) call. For this example, in some embodiments the model may represent a vector, or other data structure, with values associated with a vector space. In this example, the values may describe the user's profile and/or a current mental state of the user. The request may include information indicative of different content items, such as different routes, different advertisements, and so on. The system may analyze the received information, for example in comparison to the vector space, and select from among these content items.

Additional embodiments may include, for example, use of the data to permit sorting of users (e.g., individuals) based on the data gathered psychological profiles, which may or may not include response rates to stimuli, and to use technology to create teams of individuals (e.g., within an organization, or even classes in schools) whose personality traits are compatible, or separate ones who are incompatible, to maximize productivity or minimize tension.

As known by those skilled in the art, prior techniques relied upon static artifacts such as cookies, page views, and coarse interaction logs residing within isolated application silos, which limited their ability to react to a user's rapidly changing context. Such systems generally lacked a standardized, low-latency interface capable of accepting requests from external applications and returning actionable outputs that could be consumed reliably across heterogeneous environments. Without a request-driven service model, prior systems typically precomputed broad segments on batch schedules and applied simple rules, yielding stale or misaligned decisions that were insensitive to a user's present mental state. In contrast, the disclosed technology is organized as a subscriber-facing service that receives requests from outside systems and returns machine-usable behavioral outputs, enabling timely integration that prior monolithic approaches did not support.

Prior techniques treated user information as a narrow set of explicit inputs and clickstream traces, leaving out the disclosed multi-modal information (e.g., biometric indicators, device interaction dynamics, environmental or social context signals that can be detected via wireless endpoints, and so on). The disclosed technology instead obtains disparate historical information, augments it with real-time device-side analyses, and couples these sources within a unified processing flow that expresses user state as machine-usable features. This cross-modal synthesis materially improves the quality and reliability of downstream computations available to subscriber systems and thereby addresses deficiencies that were endemic to earlier single-modality approaches.

Centralized collection architectures in existing systems also concentrated raw biometric streams in remote servers, which increased bandwidth usage and expanded the security exposure of sensitive data. Such designs provided no technical means to confine raw signals to trusted endpoints or to transmit derived indicators suitable for decisioning. The disclosed technology employs, in some embodiments, on-device analyses which restrict raw biometrics to the user device(s) of the user while emitting processed features for service-side use.

In this way, the techniques described herein address technical problems associated with existing schemes for understanding users. At present, a content delivery network (CDN) has limited information when selecting content for presentation to a user. Given a more holistic understanding of the user, along with specific real-time information such as whether the user is stressed, receptive to information, with another user that heightens, or reduces, their stress, and so on, CDNs are able to more effectively ascertain content. Additionally, a navigation application may select, or adjust, a route to a destination that is in line with the user's mental state. As one example, the navigation application may select a less traffic heavy, or more visually pleasing, route based on an understanding of the user's current mental state. These techniques may be utilized in combination with an arbitrary amount of subscriber systems that serve content to any application, web endpoint, and so on, which is utilized by the user.

Example Block Diagrams

FIG. 1A is a block diagram of an example behavioral analysis system 100 in communication with outside systems (referred to herein as subscribers) and user device(s) associated with a user. The system 100 may represent a system of one or more computers, such as a cloud system, server system, and so on. The system 100 may also represent a user device of one or more processors, for example as described above.

In the illustrated embodiment, the behavioral analysis system 100 is receiving user information 110 associated with a user. Example user information 110 may include biometric information (e.g., sensor information, such as from user devices 112A-112N), user responses to questionnaires, user responses to personality profiles and psychological assessment tests such as Myers Briggs, ACE questionnaires, Enneagrams, attachment styles assessments, and similar tests, user reactions to activities and prompts, psychological profiling, psychological history, family history, history of associates (friends, family), online activities, and so on. Biometric information may include, for example, heart rate, blood oxygen, information derived from visual information (e.g., image sensors may obtain images or video of the user), and so on.

The information 110 may additionally reflect interactions with user devices 112A-112N. Example user devices may include laptops, wearable devices, mobile devices, vehicles, smart appliances, and so on. For example, increased interactions with devices may indicate increased stress. As another example, rapid typing, different patterns of typing or providing user input (e.g., different touch patterns from a baseline or typical pattern associated with the user), and so on, may indicate adjusted mental state (e.g., increased stress, increased ease or calm, and so on).

In some embodiments, the user devices 112A-112N may be associated with the user. For example, they may reflect user devices used by, or otherwise controlled by, the user. In some embodiments, a portion of the user devices may be associated with other users. As an example, the user may have his/her mobile device while out in public. For this example, persons who are proximate to the user may have their mobile devices on them. The system 100, or the user's mobile device, may obtain identifying information associated with these other mobile devices. For example, the identifying information may include a unique identifier associated with Bluetooth, ultra-wideband, a MAC address, and so on. In some embodiments, a device not associated with the user may obtain unique identifying information. For example, a point-of-sale device, a Wi-Fi device, and so on, may obtain unique identifying information. In this example, the unique identifying information may be provided to the system 100.

In this way, the system 100 may determine that the user is proximate to particular other persons based on the user devices being near each other. As may be appreciated, the user's friends, significant others, work colleagues, and so on, may be learned by the system 100. Additionally, via comparing biometric information to times at which the user is near certain other people the system 100 may learn stressors or adjustments to mental state which are typical or common for the user. The system 100 may also learn whether location, time, upcoming calendared events, and so on, are associated with these other people to inform the stresses or adjustments to mental state.

In some embodiments, the system 100 may consolidate, or otherwise aggregate, the user information 110. For example, the system 100 may extract ratios or other metrics associated with the information 110. The system 100 may learn a model (referred to herein as a user profile) associated with the user. The user profile may inform, for example, detailed information associated with the user's mental state, personality, and so on. The user profile may, in some embodiments, reflect features associated with the user (e.g., a vector of features) which may be with respect to a learned vector or feature space. For example, a neural network, clustering algorithm, and so on, may be used. Additional techniques to generate the user profile may be used and fall within the scope of the disclosure. As an example, the user profile may represent a template associated with an average or typical person. Deviations based on the user information 110 may then be determined by the system 100.

The system 100 may respond to requests 122 for information from outside systems or devices, which herein are referred to as subscribers 120A-120N. In some embodiments, a subscriber may reflect a back-end of an application or web service being utilized by the user. As one example, a subscriber may represent an entity associated with an audio application (e.g., a mobile streaming audio application on a user device of the user). For this example, the user may access the audio application on one of the user devices 112A-112N. The audio application may generate a request 122 indicative of the user's current mental state. For example, the current mental state may be based on the above-described model optionally along with real-time information as will be described below. As an example, the real-time information may include, or be derived from, the user's location, persons proximate to the user, use or interactions user devices, biometric information (e.g., heart rate), and so on. Recommendations of audio may be determined or formed based on a response 104 from the system 100. The recommendations may be routed for presentation via the audio application, selected for immediate play or inclusion in a queue or playlist, and so on. As another example, an advertisement system may request 122 a current mental state and use the output information 104 to select content items which may be receptive to the user. The advertisement system may additionally determine not to select a content item based on the user being determined to not be receptive to content items at that time.

The system 100 may, in some embodiments, generate reports summarizing the user profile. The reports may also indicate trend information, which may be filtered or customized according to time, location, and so on. The reports may indicate patterns associated with specific mental states, adjustments between mental states, and so on. Additional information regarding reports and responses is described below.

Figure 1B:
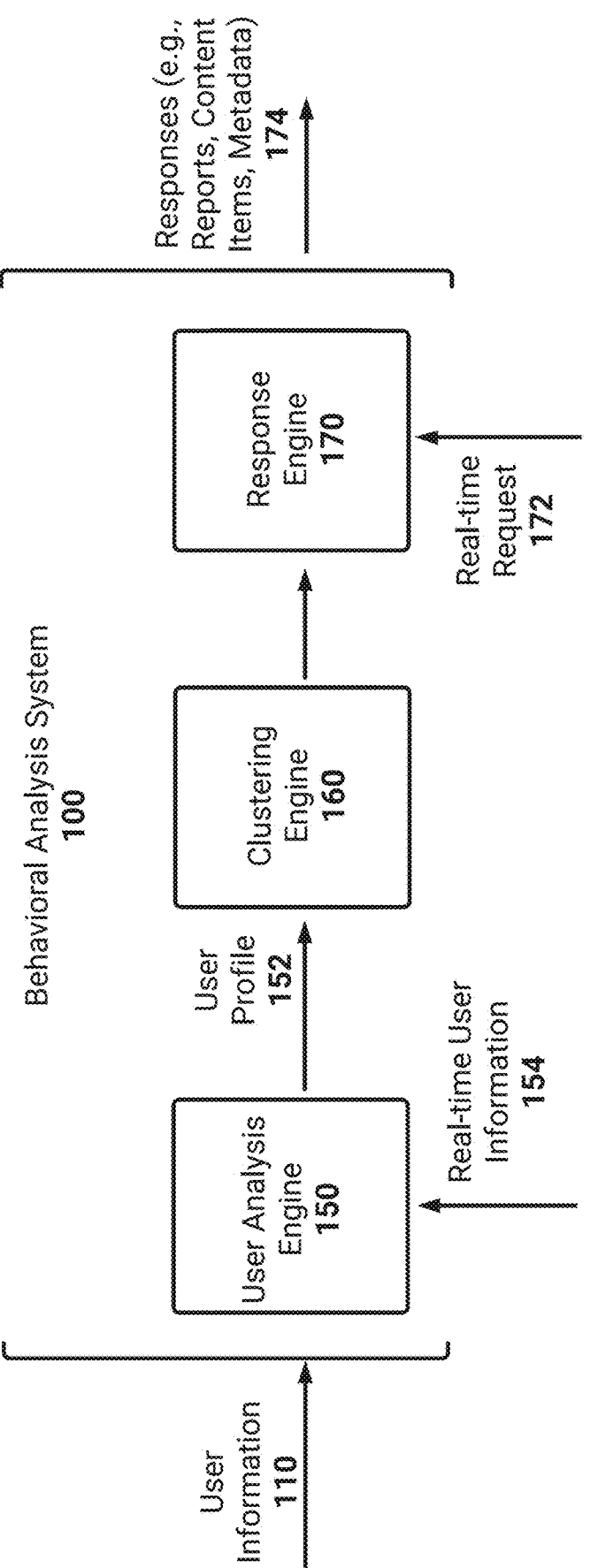
FIG. 1B illustrates detail of the example behavioral analysis system outputting responses to subscriber(s).

FIG. 1B illustrates a detailed block diagram of the behavioral analysis system 100. In the illustrated example, the system 100 includes a user analysis engine 150. As described above, the user analysis engine 150 may generate a user profile 152 (e.g., a model) reflective of characteristics of the user's mental state or personality. This user profile 152 may be updated continuously, or periodically, as new user information 110 is received. The user profile 152 may be based on historical information aggregated or collected which is associated with the user. The user analysis engine 150 may additionally receive real-time user information 154 which may be used to determine a current mental state or information which can form a response 174 to an outside system or device.

Furthermore, the system 100 may receive real-time information 154 associated with the user. For example, user analysis engine 150 may gather real-time information 154 within a short window when a real-time request 172 is received or when the user's device indicates a notable change. In some embodiments, the real-time user information 154 may be obtained from a multitude of user devices (e.g., user devices 112A-112N) used by the user. Real-time information 154 may include, for example, biometric signals, typing or touch patterns, location, calendared events, and counts of nearby devices, information indicating specific users or persons (e.g., anonymized persons or users) proximate to the user, and so on.

As one example, the information 154 may be obtained from the user's mobile device. As another example, the information 154 may also be obtained from a wearable device worn by the user (e.g., a smart watch, headphones, and so on). The user devices may execute an application or process associated with the system 100. For example, the application or process may be configured to monitor interactions with the user devices. As another example, the application or process may have access to sensor data or insights derived from sensor data. Thus, the user devices may indicate that the user is moving at a faster walking pace than normal, that the user is typing with more frequent errors than normal, that the user is speaking differently into a user device than normal, and so on.

User analysis engine 150 uses real-time information 154 as a temporary layer over a longer-term user profile so the system 100 can react quickly without permanently changing stored traits. In some implementations, both absolute levels and changes from a personal baseline are included so the system can recognize short-term shifts, such as elevated stress or calmness. If later outcomes confirm that a short-term pattern repeats, the system 100 may gradually blend that evidence into the longer-term profile with appropriate weighting. If not confirmed, the temporary layer naturally expires when its freshness window closes. This approach keeps the profile stable while still allowing rapid, context-aware adjustments.

Clustering engine 160, which is described in more detail below, uses real-time information 154 to select which similar users or situations should guide the next decision. For example, when the snapshot shows signs of stress and a crowded environment, clustering engine 160 may emphasize past situations that match those conditions rather than relying on average behavior. When the snapshot shows calmness and focused interactions, it may choose a different set of similar situations. By tying neighborhood selection to the current snapshot, clustering engine 160 improves relevance and avoids decisions based on stale history.

Response engine 170 uses real-time information 154 together with the selected neighbors to generate response 174 for the requesting subscriber. As one example, response engine 170 may advise a navigation application to avoid congestion when the snapshot indicates stress above a baseline. As another example, response engine 170 may instruct a point-of-sale system to simplify choices or adjust timing when input patterns suggest the user prefers less friction. Response engine 170 includes freshness and confidence with response 174 so the subscriber can act promptly or wait for a better snapshot if needed. Thus, real-time information 154 helps produce timely, context-appropriate actions while respecting privacy and data quality.

The system 100 may include a clustering engine 160 that can cluster the user profile 152 with respect to other user profiles of other users. Thus, the system may determine where different users place in proximity to each other. In some embodiments, the user profile 152 may be adjusted as new information is received. Thus, the clustering engine 160 may update clusterings, or positions, of users. For example, based on user A's profile being updated the engine 160 may trigger updates to other profiles.

Clustering engine 160 may position the user profile 152 relative to other user profiles in a multi-dimensional feature space. Similarly, clustering engine 160 may maintain those positions as user profiles evolve over time (e.g., as new information is received). In the illustrated arrangement, clustering engine 160 receives the current user profile 152 from user analysis engine 150 and determines inter-user proximity relationships that reflect behavioral similarity; as the user profile 152 is updated with new evidence, clustering engine 160 updates the associated placement and may propagate related updates to affected neighbors so cohort boundaries remain accurate over time. Clustering engine 160 exposes these neighborhood relationships to response engine 170 so that responses 174 requested by external systems can leverage similarity-informed expectations in addition to real-time mental state signals.

Features forming the user profile 152 may be learned using neural networks or clustering techniques (e.g., k-means clustering). Example features may include, or otherwise encode, biometric parameters, interaction metrics, assessment-derived traits, and/or environmental context for similarity computation. In such configurations, the placement performed by engine 160 uses similarity metrics over these vectors to position users relative to one another for downstream analysis and response generation.

Features utilized in the user profile 152 may be learned using neural networks or unsupervised techniques and arranged within a learned multi-dimensional space, allowing consistent comparison across users despite differing data sources. Example biometric-derived dimensions can include stress-response indicators computed on the user device, such as heart-rate and blood-oxygen statistics and their deviations from a learned baseline, with optional voice prosody or eye-tracking metrics where available; in these configurations, raw biometric streams remain restricted to the device and processed indicators are furnished to the system for clustering. Interaction metrics can encode dynamics of user input and software use, such as timing and variability of touch, speech, and keyboard interactions and application navigation patterns, again summarized as privacy-preserving statistics for inclusion in the vector. Assessment-derived traits may incorporate standardized instruments and psychological profiling, including Myers-Briggs, Big Five, Enneagram, ACE, and attachment-style assessments, combined into trait factors with reliability weighting based on observed behavior over time. Environmental context features can include location and calendared-event indicators, measures of persons proximate to the user derived from wireless endpoints, and recognition of known associates via device identifiers captured by nearby systems or the user's device and provided as pseudonymous signals for analysis. Many features are expressed both as absolute values and as deltas from a learned personal baseline, capturing moment-to-moment aberrations against the user's normal state for improved discriminability in the clustering space.

Clustering engine 160 applies similarity metrics over these vectors to position user profile 152 relative to other profiles and to maintain neighborhood relationships as evidence evolves. Distance functions such as Euclidean, Manhattan, and Mahalanobis distance, and direction-sensitive measures such as cosine similarity, may be employed to compute proximity. As described above, cohort formation can use clustering techniques like k-means clustering. In some embodiments, hierarchical clustering or density-based spatial clustering of applications with noise (DBSCAN) with either hard assignments or soft neighborhood scores retained for downstream weighting. Temporal weighting and dynamic reliability weighting can be incorporated so recent, validated observations influence proximity more than stale or low-confidence signals, yielding neighbor scores with associated confidence and validity horizons that reflect decay over time. The resulting proximity structure is exposed to response engine 170 so that responses can leverage similarity-informed expectations together with real-time mental-state indicators when servicing subscriber requests within defined freshness windows.

When user analysis engine 150 supplies fresh observations (e.g., the real-time information 154) or a revised user profile 152, the engine 160 revises proximity relationships and, where ripple effects occur, propagates recalculations to impacted neighbors so the clustered topology reflects current evidence rather than stale history. This continuous refinement supports near real-time responsiveness for response engine 170, which may depend on updated neighborhoods to answer requests 172 within temporal validity windows communicated to subscriber systems. Incorporating these windows acknowledges that prediction reliability decays over time and ensures subscriber-side decision timing remains aligned with evidence freshness.

In some embodiments, temporal weighting may be integrated so that recent, stable observations influence proximity more than stale or volatile signals. In this configuration, the engine 160 processes feature inputs whose weights reflect recency and validation success, and it furnishes neighbor scores with confidence values that degrade according to formal decay functions. The resulting outputs allow response engine 170 to include confidence and temporal validity windows in responses 174, thereby providing explicit freshness semantics for subscriber-side consumption. Suitable formulations and reporting structures for confidence and validity are described for the architecture of system 100.

In some embodiments, similarity transfer for novel situations is enabled by the neighborhoods that clustering engine 160 maintains. When a user encounters a new person or context with little direct history, clustering engine 160 consults nearest neighbors in the behavioral vector space and projects patterns learned from those neighbors to the novel combination, associating each projection with a confidence measure and a temporal validity interval so that downstream consumers act within freshness constraints. As one illustrative example, a coffee-shop point-of-sale subscriber may have observed that the user tends to select a first item when accompanied by a first companion and a second item when accompanied by a second companion. Upon detecting a new companion whose profile is behaviorally proximate to the first companion, clustering engine 160 treats the new pairing as analogous and supplies neighborhood-derived expectations to the response engine 170. Thus, the engine 170 may return response 174 instructing the subscriber to select the first item while the associated validity window remains open.

In some embodiments, clustering engine 160 conditions similarity transfer on real-time information 154 associated with the user rather than requiring any profile for the newly encountered companion or context. Clustering engine 160 first identifies a neighborhood around user profile 152 within the learned vector space and retrieves episodic signatures that characterize prior co-presence situations, such as interactions when the user was accompanied by a first companion or a second companion. Upon receipt of a real-time request 172, user analysis engine 150 is triggered to aggregate real-time information 154 within a threshold window (e.g., the prior 30 seconds, one minute, 30 minutes, two hours, and so on). This information 154 may include biometric deltas from a learned baseline, input-dynamics metrics, vocal or speech-derived indicators, environmental measures such as proximate-device density, and so on. Clustering engine 160 compares this real-time signature to the episodic signatures of the retrieved neighbors and selects patterns whose response profiles most closely match the current real-time state, independent of whether a profile exists for the new companion. In this way, the system 100 may ascertain that the new user is evoking physiological responses in line with physiological responses known to be associated with a known companion (e.g., the first companion or second companion described above). Response engine 170 generates response 174 using the matched patterns with an associated confidence and validity interval so that downstream systems can time or sequence actions while the real-time evidence remains fresh.

The system 100 may include a response engine 170 which outputs responses 174 based on a received request 172. As described above, the request 172 may be used to respond to an outside system or device to inform the user's current mental state.

As one example, an outside system may be associated with a coffee shop. The coffee shop may store information indicating that the user comes into the shop and orders a latte. Based on the user profile, for example biometrics, the system 100 stores information reflecting the user's typical mental state when ordering. However, at times the user may appear with a different user and at these times the user information 154 may reflect an increased, or reduced, heart rate. The system 100, or coffee shop (e.g., a system associated with the coffee shop), may determine that at those times with the different user the user's order is different (e.g., tea, muffin). For this example, the user may enter the shop without the different user but their biometric information (e.g., real-tie user information 154) may be similar to those times where the different user is present. Thus, the coffee shop (e.g., a point-of-sale system or other system presenting selectable menu options) may generate a request 172. The coffee shop may use an output response 174 to automatically select the tea and muffin or a discount thereof.

As another example, an application associated with recommending restaurants, coffee shops, and so on, may execute on the user's mobile device. The user may search for a coffee shop, and the application may provide a request 172 to the system. The system 100 may determine that the user's mental state, such as stress, increases in crowded rooms or coffee shops. Thus, the system 100 may provide output 174 to the application such that the application can select a coffee shop that is associated with reduced stress.

Additional examples are described below in more detail, with respect to at least FIGS. 3A-3C.

Figure 2A:
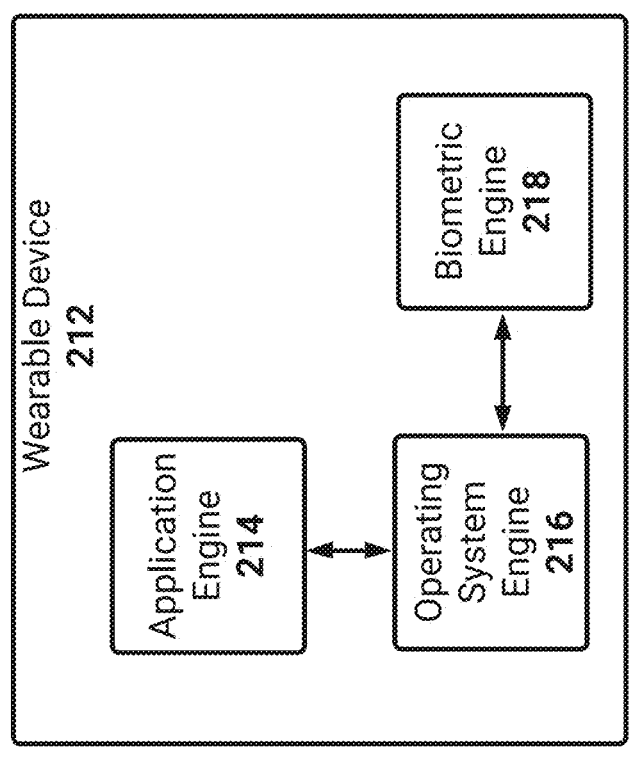
FIG. 2A illustrates detail of an example user device and an example wearable device associated with a user.
Figure 2A:
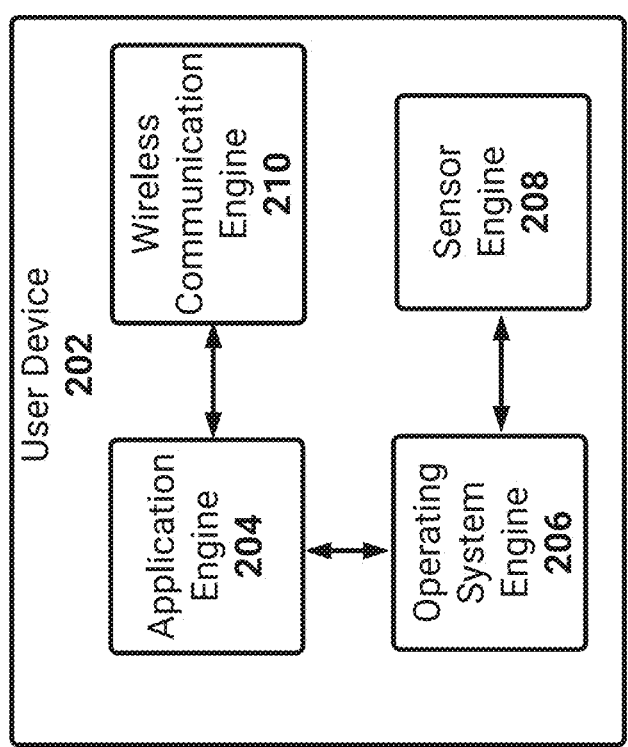

FIG. 2A illustrates detail of an example user device 202 and an example wearable device 212 associated with a user. As described herein, the user devices may be used to inform a mental state associated with the user. For example, information obtained from the user devices 202, 212, may be used to form a living user profile associated with the user. The user profile may be leveraged to customize applications, such as mobile or web applications, software processes, and so on, utilized by the user. For example, and as described in FIG. 3C, a large language model (LLM) may receive user profile information to customize generated text to better correspond with the user's current mental state.

In the illustrated example, the user device 202 includes an application engine 204, an operating system engine 206, a sensor engine 208, and a wireless communication engine 210. In operation, application engine 204 executes as a local process that requests data through operating system engine 206. For example, the application engine 204 may represent an application obtained from an application store (e.g., app store). When a subscriber request or local trigger occurs, application engine 204 initiates a collection window and forms real-time information by analyzing sensor-derived signals and interaction events that the operating system 206 exposes to applications within their permission scope. The operating system engine 206 may that enforces permissions, consent, and rate limits for the consumer application.

While not shown, the application engine 204 may be in communication with another application, software, endpoint, and so on. For example, the other application may reflect a consumer application (e.g., a mobile application, consumer web service or web application, and so on). In this example, the other application may be associated with a server that outputs information for inclusion in the application. For example, server may request mental state information and derive, or determine, information based on the mental state. As some examples, the server may determine recommended content items, recommended menu items, text for inclusion in an email or note taking application, and so on. Thus, the consumer application may update, such as via presentation of information, based on the mental state information aggregated, at least in part, via the application engine 204.

In some embodiments, application engine 204 may perform device-side analysis. For example, the application engine 204 may subscribe to operating system notifications for events such as input timing, screen interactions, activity transitions, health or motion updates, and so on. Within a defined window, application engine 204 may compute summary measures, normalize units, attach timestamps and quality flags, and/or prepare an ephemeral snapshot suitable for transmission. In some embodiments, the transmitted snapshot may include processed indicators rather than raw streams. For example, the engine 204 may not have access or permissions to certain types of data (e.g., raw sensor data) and thus generate, or obtain, processed versions (e.g., a measure of walking speed rather than sensor data forming raw walking movements).

Operating system engine 206 represents operating system services that mediate all access to sensors and protected data. Permissions, entitlements, and user consent dialogs may be enforced at this layer, and the data returned to application engine 204 can vary by platform policy. In some cases, operating system engine 206 may provide generalized insights or rate-limited summaries instead of raw data. For example, a platform may expose heart rate as periodic values or stress-related indicators while withholding continuous waveforms. This arrangement allows raw biometric information to remain confined to the device while the system consumes processed indicators, consistent with the restriction that raw biometrics are not transmitted to the service.

Sensor engine 208 coordinates signals from device-resident sensors through operating system engine 206. Examples include motion and position sensors, touch and keyboard subsystems, microphones processed by speech services, and cameras processed by eye- or face-related services where permitted. Sensor engine 208 exposes those measurements that the operating system authorizes for the requesting application, such as interaction dynamics or speech-derived metrics, rather than the underlying raw audio or video. Interaction measurements can include timing and variability associated with touch, keyboard, or speech input, which are obtainable as application-accessible events under the operating system's permission model.

Wireless communication engine 210 manages radios and system-level scanning features that the operating system permits, such as Bluetooth Low Energy, ultra-wideband, Wi-Fi, and cellular. Using operating system facilities, wireless communication engine 210 can compute measures of nearby device density or proximity without exposing stable identifiers, allowing the system to infer whether the user is in a crowded environment or near known associates. These measures can be included in the real-time snapshot as counts, coarse proximity buckets, or anonymized signals, which support downstream use cases that rely on the number of persons or devices proximate to the user.

User device 202 can also cooperate with a wearable device 212 over se operating system channels. In this configuration, operating system engine 206 brokers access to data that wearable device 212 acquires through its biometric engine 218, such as heart rate or related metrics. Some platforms permit summarized values or trend indicators to flow from wearable device 212 to application engine 204, while keeping high-frequency or raw biometric signals within the wearable or the host device's protected store. The architecture in FIG. 2A therefore supports cross-device sensing while honoring platform-level data sharing limits.

To align data collection with subscriber needs, application engine 204 triggers the operating system to deliver events and summaries during a threshold window and then form the snapshot. This windowed model reduces bandwidth and ensures that downstream responses are based on timely evidence. The snapshot can include location and calendared context, interaction dynamics, biometric summaries, and proximate-device measures. This use of time-bounded collection and standardized packaging supports low-latency responses with explicit validity horizons for external systems.

Privacy and security may be built into each layer. Operating system engine 206 limits the scope of accessible sensors, requires user consent, and may redact or coarsen sensitive data. Application engine 204 performs on-device reduction so that derived indicators are transmitted, satisfying the requirement that raw biometric data remain on the device. Wireless communication engine 210 can further restrict scanning to modes that yield counts or coarse proximity, avoiding persistent identifiers. This technical arrangement enables robust data gathering from mobile phones and laptops within modern operating system constraints while still supplying useful, privacy-preserving real-time information for behavioral analysis and response generation.

Wearable device 212 may similarly include an application engine 214, operating system 216, and the above-described biometric engine 218. As a wearable device, it may have access to different data than user device 202. For example, the wearable device 212 may have finer-grained, or otherwise more detailed, biometric information (e.g., heart rate, blood oxygen, cardiac waveform characteristics, finer understanding of movement and actions, and so on).

Biometric engine 218 may thus collect, for example, signals from sensors such as photoplethysmography, electrical heart activity, accelerometers, gyroscopes, skin temperature sensors, or galvanic response sensors where available. In some implementations, biometric engine 218 performs on-device processing that includes artifact removal, quality scoring, and derivation of metrics such as heart rate, heart-rate variability, respiration proxies, step count, and sleep or activity state. Raw waveforms can remain confined to the wearable, and derived metrics or trend indicators are made available upstream. Biometric engine 218 may maintain a short rolling buffer for stability checks and attach timestamps that enable synchronization with information arriving from a companion device.

Operating system engine 216 governs how biometric and motion information is shared with applications and other devices. Depending on platform policy and user consent, operating system engine 216 may deliver generalized insights or rate-limited summaries rather than raw data. For example, heart rate may be provided as periodic values, or as event notifications that a threshold has been crossed, while detailed optical or electrical waveforms are withheld. Operating system engine 216 may also expose activity classifications, movement intensity, or posture changes as discrete events. Short-range radios and pairing, including encryption and bonding, are likewise controlled by operating system engine 216 so that any transfer to a companion device uses secure channels.

Similar to engine 204, application engine 214 forms a time-bounded snapshot suitable for downstream use by obtaining permitted metrics from operating system engine 216 during a defined collection window. Application engine 214 may normalize units, compute deltas from a personal baseline kept on the wearable and annotate each field with freshness and signal-quality indicators. When certain metrics are not available on a given platform, application engine 214 can request higher-level insights instead, or derive approximations from permitted inputs, such as computing basic heart-rate variability statistics from periodic heart-rate values. The snapshot can be retained locally until a companion device is reachable, at which point the data is transferred without exposing raw biometric streams.

In a tethered configuration, wearable device 212 communicates the snapshot to user device 202 over secure operating system channels so the user device can combine the wearable metrics with interaction and environmental information gathered locally. In a standalone configuration, wearable device 212 may transmit the same snapshot directly to a service endpoint when allowed by platform policy, again restricting the payload to derived indicators. Data collection may be aligned with power and privacy constraints. For example, sampling rates may be reduced when the device 212 is idle, background execution may be limited to scheduled windows, and sensitive metrics are shared at the level of abstraction granted by operating system engine 216. This arrangement enables wearable device 212 to provide useful, privacy-preserving biometric context for real-time analysis while respecting the access and consent rules of modern platforms.

Optionally, devices 202, 212, may communicate with external devices or systems. For example, user device 202 may be paired with a system included in a vehicle of the user. In this example, the user device 202 may obtain operation information from the vehicle during a threshold collection window, such as one or more of steering and braking events, lane-keeping status, human-machine interface interactions on the vehicle display, voice command usage, or cabin context that the vehicle exposes through authorized channels. The vehicle may additionally publish additional occupant-facing metrics, such as eye-tracking indicators or verbal speech metrics summarized by in-cabin services. When platform policy or consent limits access, the vehicle may provide periodic values or coarse insights instead of continuous data, for example reporting heart rate as intervals or a stress-related score rather than a waveform. The same exchange can include location and trip context, as well as a measure of persons proximate to the user derived from wireless sensors or occupancy systems, conveyed as counts or proximity buckets rather than stable identifiers, thereby enriching environmental context while maintaining privacy.

In other embodiments, information from the vehicle may be routed via a vehicle cloud service to the system 100. For example, based on user consent the system 100 may integrate with external systems that include user information. As another example, the vehicle cloud service may represent a subscriber of the system 100. For example, during navigation the vehicle cloud service may communicate with the system 100 to route the user based, at least in part, on the user's mental state. In this example, a navigation stack may be instructed to alter a route to reduce expected stress based on the user profile and real-time information gathered for the trip, with the action taken while the response remains fresh.

Figure 2B:
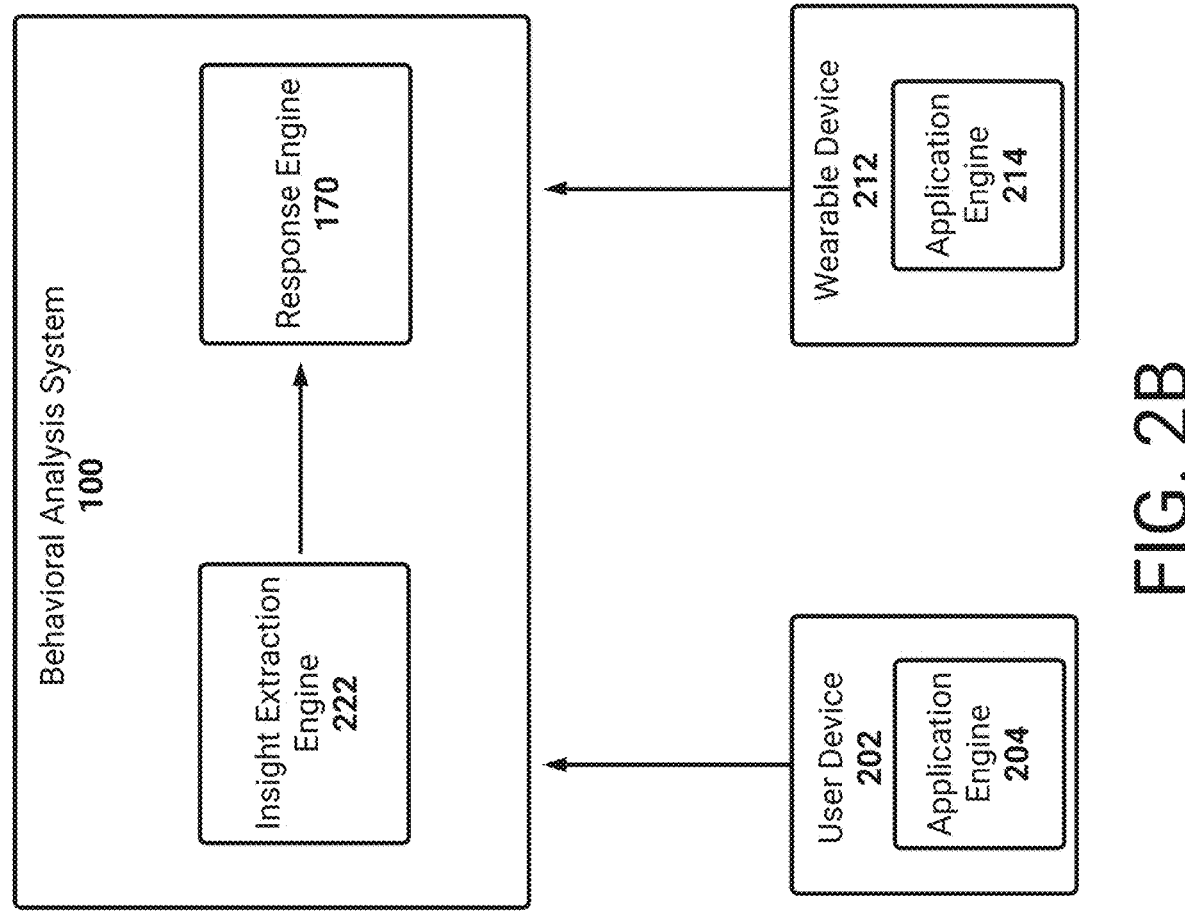
FIG. 2B is a block diagram of the example behavioral analysis system extracting behavioral insights based on information from user device(s).

FIG. 2B is a block diagram of the example behavioral analysis system 100 extracting behavioral insights based on information from user device(s) 202, 212. In the illustrated example, insight extraction engine 222 receives information from the devices and generates insights. For example, the insights may be generated based on the user profile (e.g., as described in FIGS. 1A-1B) along with real-time information from user devices 202, 212.

An example insight may include, for example, a measure or information indicating stress of the user. Another example insight may include an environmental context (e.g., how crowded it is around a user, a number of persons known to be associated with the user and their context, such as friends, work colleagues, and so on). Another example insight may include a measure of receptiveness (e.g., whether the system 100 ascertains that the user is feeling open to experiences, content, and so on). Another example insight may include arousal states relative to a personal baseline. Additional examples of insights may be used and fall within the scope of the disclosure herein. Individual insights may include a confidence and optionally a validity window so that downstream systems, such as subscribers, act while the evidence remains fresh.

Insight extraction engine 222 may provide mental state and risk-related insights that go beyond a binary stressed or not stressed. Examples include elevated stress tied to a specific activity or route segment (e.g., with respect to driving), reduced arousal following a calming routine, or a crisis-risk indicator when multiple signals align in concerning patterns. When repeated measurements show a persistent association between a path and heightened stress, the engine 222 can flag the segment and recommend avoidance or mitigation, with subsequent observations used to confirm the trigger and refine the response strategy. In more serious cases, the engine 222 can surface alerts that suggest de-escalation or protective measures, and can suspend behavioral targeting during periods of crisis, consistent with the context materials' safeguards for vulnerable states.

Environmental context insights can specify whether the user is likely in a crowded setting based on the number of nearby devices seen through permitted wireless measures, whether a scheduled event is underway, and whether the current location historically correlates with a change in mental state. The engine 222 can also recognize idiosyncratic routines and time-of-day patterns, such as predictable weekly visits that consistently precede a stress increase or a calm period and can recommend timing adjustments to reduce friction or enhance focus around those events. These insights can be reported as simple, machine-usable fields such as crowding level, location-trigger match, or "precommute stress rise likely," each with freshness and confidence to guide downstream actions.

Social and influence insights describe how the presence of particular companions, or behaviorally similar companions, affects choices and states. For example, the engine 222 may indicate that a companion is associated with a shift toward certain venues or content types, or that the user is more receptive to suggestions when with a specific person. When a new companion appears, the engine 222 can transfer patterns from behaviorally similar companions to predict preferences and can also emit timing insights that recommend when to present options or when to wait for a more private moment before suggesting sensitive actions or communications. The materials also contemplate pre-send interpretation insights that help shape communications based on current compatibility and state, so messages land as intended rather than being misread under stress.

Vehicle and in-cabin insights can be derived when permitted operation information is available from a paired vehicle system. Examples include distraction risk based on eye-tracking and HMI interaction patterns, speech-derived arousal cues, and trip-phase stress that rises near certain waypoints. From these signals the engine may recommend a calmer route, reduced notification density, or simplified interface choices for the remainder of the trip, with actions taken while the validity window remains open. These vehicle-derived insights may be combined with crowding and location indicators to produce richer guidance during transit or at arrival.

Quality, identity, and population context can further shape insight outputs. The engine 222 may emit a cross-device consistency insight that confirms when multiple devices agree on the user's current state or flags a probable sensor anomaly, so subscribers avoid acting on questionable data. It can also provide a behavioral authentication confidence based on interaction patterns when appropriate and include temporal confidence scoring that decreases as observations age. Where allowed, population baselines by geography or industry can be referenced so an individual's current readings are interpreted against typical ranges for similar cohorts, without revealing any individual identity in the process.

Insight extraction engine 222 can perform the primary derivation of insights at the system side by combining device-provided signals with the historical user profile. In some embodiments, part of the processing may be performed via devices 202, 212. For example, application engines 204 and 214 may compute the stress or context indicators locally and transmit the derived results to insight extraction engine 222. This shared processing approach reduces the amount of sensitive data that leaves the devices while still enabling the system to align and compare insights across sources and over time. The specification contemplates both centralized extraction by the system and distributed, privacy-preserving computation on the devices, with consistent request and response handling in either case.

Response engine 170 uses the insights to form a response that can guide a subscriber's actions, such as selecting content, adjusting presentation timing, or altering a navigation route. The response reflects both the long-term profile and the fresh device evidence, and may, as an example, be designed for consumption by external applications in real time (e.g., external subscribers as described herein). Example responses include identifying a content item for presentation or instructing a navigation system to adjust a route when the current stress indicators exceed a baseline, all within the explicit validity window established for the insights.

In some embodiments, processing may be substantially constrained to occur on the user devices. For example, the user device may be executing a consumer application (e.g., a front-end) associated with a subscriber. As one example, the consumer application may reflect a video streaming application. As another example, the consumer application may reflect a restaurant recommendation application. For these examples, the user device may generate a response regarding mental state and provide to the subscriber.

The user device may execute an application associated with the system 100, such as the application engine described in FIG. 2A. In some embodiments, the user device may implement operating system level functionality associated with mental state analyses. Thus, the consumer application may leverage, as one example, an application programming interface (API) associated with the operating system. The consumer application may additionally receive information via the application. For example, the consumer application may directly receive mental state analyses (e.g., insights, as described herein). As another example, the back-end associated with the consumer application may receive mental state analyses from the application.

The device 202 may also pair with other user devices to enrich local analysis. For example, a wearable can provide summarized metrics such as periodic heart rate or activity state through operating system-managed, secure channels, and a vehicle system can provide operation-related summaries such as display interaction patterns or speech-derived indicators. The user device fuses these permitted summaries with its own interaction and context signals, extracts insights on device, and generates the response for the local subscriber back-end. Raw biometric or media streams may thus remain confined to their originating devices, with processed indicators used for local computation.

Thus, in some embodiments, the user device 202 may form insights on-device using signals available through operating system engine 206 and, when paired, summarized metrics from wearable device 212 or other user devices or systems (e.g., vehicles, audio systems, and so on) over secure channels (e.g., wireless or wired channels). Within a window, the application engine 204 may obtain allowed indicators such as interaction dynamics, location and calendared context, coarse measures of nearby devices, and/or device-permitted biometric summaries from the wearable device 212, while raw streams remain on device 202. The application engine 204 may consult a locally cached user profile or, if allowed and needed, fetch a compact profile or policy update from behavioral analysis system 100, then fuse that information with the fresh snapshot to produce time-bounded insights.

To keep long-term understanding current, the user device can periodically transmit privacy-preserving updates to the behavioral analysis system 100. These updates may include the extracted insights, baseline adjustments, or episodic summaries rather than raw sensor data. The behavioral analysis system 100 may update the historical profile over time using these device-provided indicators, while leaving moment-to-moment decisioning in the hands of the device. This arrangement reduces bandwidth, respects platform permissions, and allows the application to act quickly on fresh evidence.

The same pattern supports a wide range of subscribers that run locally, including navigation, content selection, messaging, and commerce flows. A navigation module can request a local response before altering a route; a media module can request a local response before selecting a track or deferring suggestions; and a commerce module can request a local response to simplify choices during checkout. In each case, the device extracts insights, forms the response, and returns it to the application's own back-end on the device, optionally refreshing the historical profile from the behavioral analysis system when needed and sending periodic summaries back to refine the profile over time.

Figure 3A:
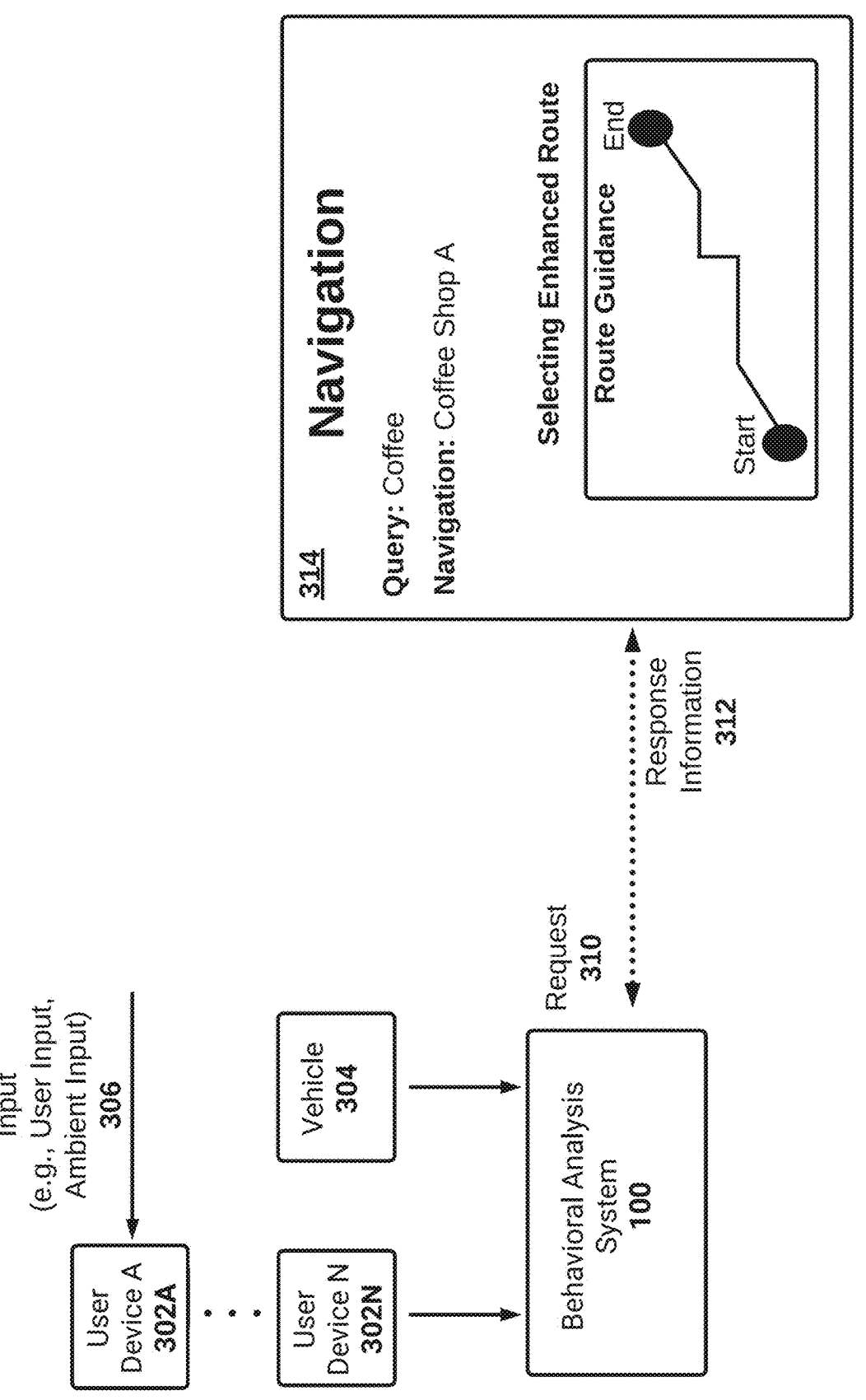
FIG. 3A is a block diagram of an example embodiment in which the example behavioral analysis system is associated with navigation.

FIG. 3A is a block diagram of an example embodiment in which the example behavioral analysis system 100 is associated with navigation. In the illustrated embodiment, the system 100 may be utilized to inform navigation, such as a location, a route, and so on. Navigation user interface 314 may represent an in-vehicle user interface or a user interface presented via a user device of a user (e.g., a navigation mobile application). Thus, the navigation may relate to driving, biking, or walking.

User device A 302A and user device N 302N provide input 306 that reflects permitted user input and ambient input observable during a short collection window. In some embodiments, input 306 includes processed indicators of biometrics, interaction dynamics such as touch or keyboard timing, location, and calendared context, together with measures of persons proximate to the user derived from wireless sensors. These indicators are obtained within the platforms' permission models and can be provided as periodic values or coarse insights when raw signals are restricted, enabling downstream behavioral analysis without exposing sensitive streams.

Ambient input may reflect context signals observed around the user that do not arise from the user's deliberate interactions with a device. In contrast to user input such as touch, speech, or keyboard events, ambient input may encompass passively observed or system-reported conditions such as who is nearby or traveling with the user, where the user is, what scheduled event is underway, and what in-vehicle or environmental signals indicate about the situation. Examples described herein may include measures of persons proximate to the user based on wireless sensing and recognition of known nearby devices, scheduled calendar events and location, and operation information from a vehicle such as eye-tracking indicators or speech-derived metrics made available by the vehicle system.

Ambient input may include social context and routine patterns that system 100 can observe or receive, such as who is proximate to the user, current location and scheduled events, and in-vehicle or environmental signals available from external systems. This data may arrive as counts, coarse proximity, or known device indicators, and can be correlated over time with the user's physiological and interaction signals to learn how specific companions and recurring situations affect mental state. Where available, additional context such as in-cabin measurements or companion status is included; otherwise, system 100 relies on permitted proximity measures and historical co-presence patterns to adjust routing, presentation timing, or other actions.

Vehicle 304, such as a system or processor within the vehicle 304, may provide an additional source of context. Thus, the vehicle 304 may communicate operation information to system 100 directly or via user device(s) 302A-302N. Example information may include in-cabin eye-tracking indicators, verbal speech metrics, user input patterns or metrics associated with an in-vehicle display, and other occupant-facing measurements that the vehicle exposes through authorized channels.

Behavioral analysis system 100 receives request 310 from a navigation system and trigger aggregation of real-time information within a threshold window, drawing on signals furnished by devices 302A-302N and vehicle 304. The system accesses a user profile built from historical information and fuses it with the fresh evidence to estimate mental-state indicators and related context for the current trip segment. The request-driven, time-bounded aggregation enables navigation 314 to act on current conditions rather than stale observations.

Behavioral analysis system 100 returns response information 312 that includes one or more insights such as stress level relative to baseline, environmental context, and a receptiveness measure, each with confidence and a validity window. When the navigation system is the subscriber, response information 312 can include instructions to adjust a route that the navigation system generated, allowing the subscriber to modify path selection, timing, or presentation density while the insights remain fresh.

The navigation system may apply response information 312 to produce a route that reduces expected stress or mitigates known triggers. As one example, when the system indicates heightened stress, navigation may avoid congestion or locations historically associated with adverse responses, even when doing so increases travel time. As another example, when a local search or coffee-shop query is active, navigation may prefer a destination associated with lower stress in similar contexts, such as a less crowded venue along the path, based on the combined effect of the user profile and real-time evidence.

User device inputs 306 can further influence route choices by reporting the presence of nearby devices that suggest crowding, which allows the system to steer around areas likely to elevate stress for the current session. The same inputs may indicate whether current signals show the user is more or less stressed than baseline, enabling navigation to simplify prompts or defer non-essential interactions until a calmer segment of the trip is reached. These behaviors align with the response types contemplated for navigation subscribers and with the use of proximity measures derived from wireless sensing.

In the illustrated example, the user provided a query of 'Coffee' in user interface 314. The user interface 314 indicates that the user is then to be routed to Coffee Shop A. In addition to selecting, or adjusting, a route based on the response information 312, the navigation system may select a particular coffee shop (e.g., automatically). This selection may be informed by the user's mental state. For example, the coffee shop may be known to be tranquil (e.g., based on a search of reviews). As another example, the coffee shop may be associated with a less stressed state of the user based on historical visits to the coffee shop.

Figure 3B:
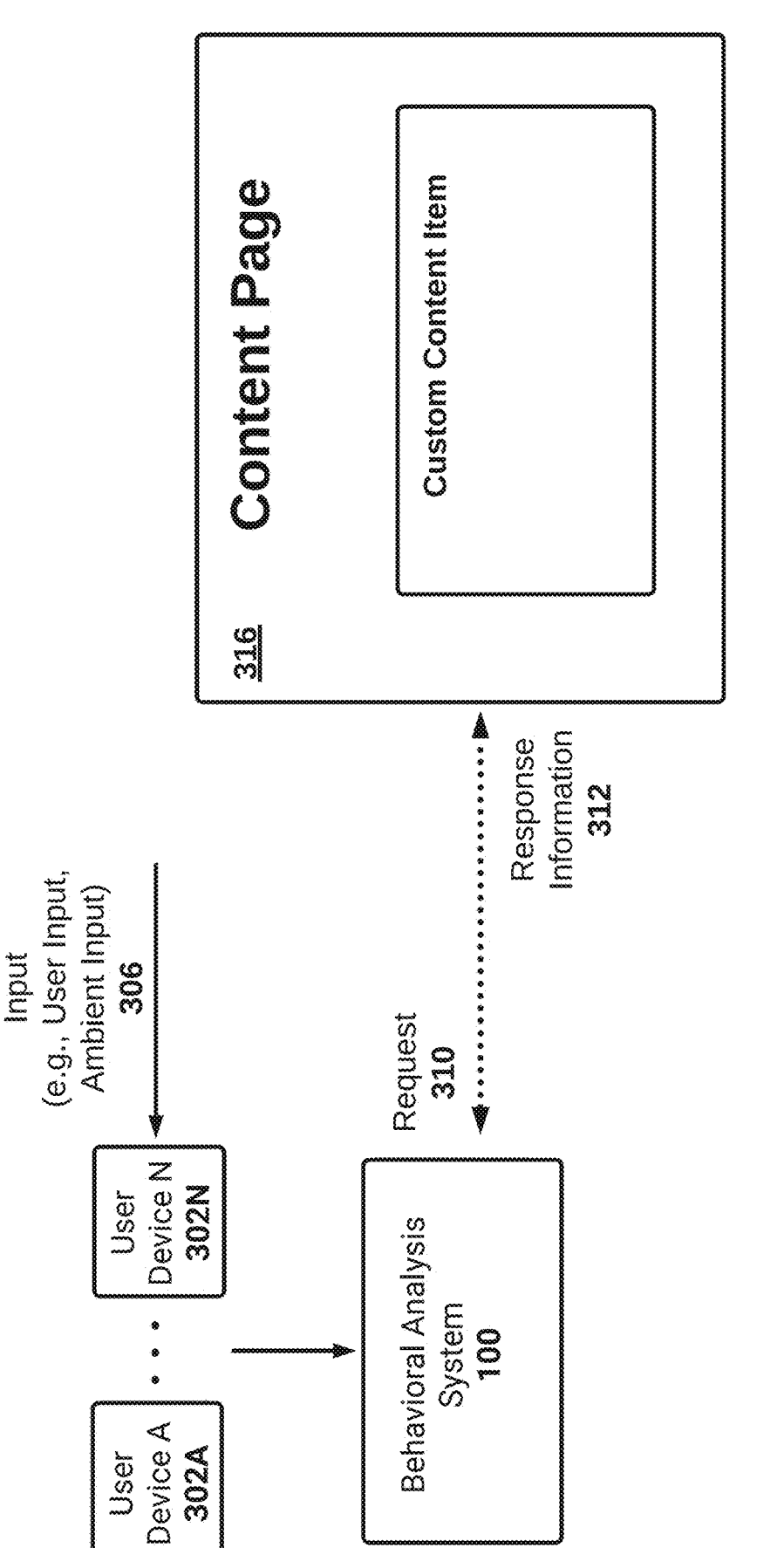
FIG. 3B is a block diagram of an example embodiment in which the example behavioral analysis system is associated with a content delivery network.

FIG. 3B is a block diagram of an example embodiment in which the example behavioral analysis system is associated with a content delivery network. In operation, a subscriber associated with a content page 316 issues a request 310 for behavioral context and receives response information 312 to guide selection and presentation of a content item. The content item can be any media or message suitable for delivery via the subscriber's application or service, including, for example, an advertisement, a movie, a streaming video, or music, and the response is configured to inform presentation within the subscriber's interface.

User device A 302A and user device N 302N provide input 306 that reflects permitted user input and ambient input collected within a short window, such as interaction dynamics, location, proximate-person measures derived from wireless sensors, and other information as described herein.

Behavioral analysis system 100 receives the request 310 from the subscriber and, in response, accesses a user profile built from disparate historical information while also triggering aggregation of real-time information within a threshold window of time. The system then determines insights from the profile and the fresh evidence, such as a stress level relative to baseline, information indicative of environmental context, and a measure of receptiveness, to support timely decision making for the content session.

Response information 312 includes the insights needed by the subscriber to select, rank, or time content for the user, and may be accompanied by metadata such as confidence and a validity interval so actions can be taken while the evidence remains fresh. For example, when response information 312 indicates elevated stress in a crowded setting, the subscriber may prefer calming media or defer non-essential prompts; when receptiveness is high, the subscriber may present higher-engagement choices or invitations to interact.

Content page 316 applies response information 312 to identify a content item from a set of candidates and to cause presentation of the selected item within the subscriber's application. In one arrangement, the behavioral analysis system routes or references the selected item to the subscriber for inclusion, allowing integration with ad servers, streaming catalogs, or music queues via standard interfaces. This request-driven selection is expressly supported where the response identifies a content item based on the profile and real-time information, and presentation is caused via the subscriber's application or web service.

As another example, the same workflow enables fine-grained creative or placement choices. For advertisements, the subscriber may choose a less intrusive creative or a different campaign when the response indicates low receptiveness; for streaming media, the subscriber may steer toward genres historically associated with reduced stress under similar context; for music, the subscriber may bias tempo and energy to match the indicated state. The background materials contemplate subscribers using behavioral outputs to modify content items presently being provided to the user, aligning delivery with the user's current condition rather than static preferences.

In this configuration, user devices supply permitted, privacy-preserving indicators, while behavioral analysis system 100 returns response information 312 that the subscriber can apply immediately within content page 316. The result is a content delivery pattern in which request 310 and response information 312 enable targeted, time-bounded selection and presentation of ads, movies, streaming video, music, and other media across heterogeneous applications and services.

Figure 3C:
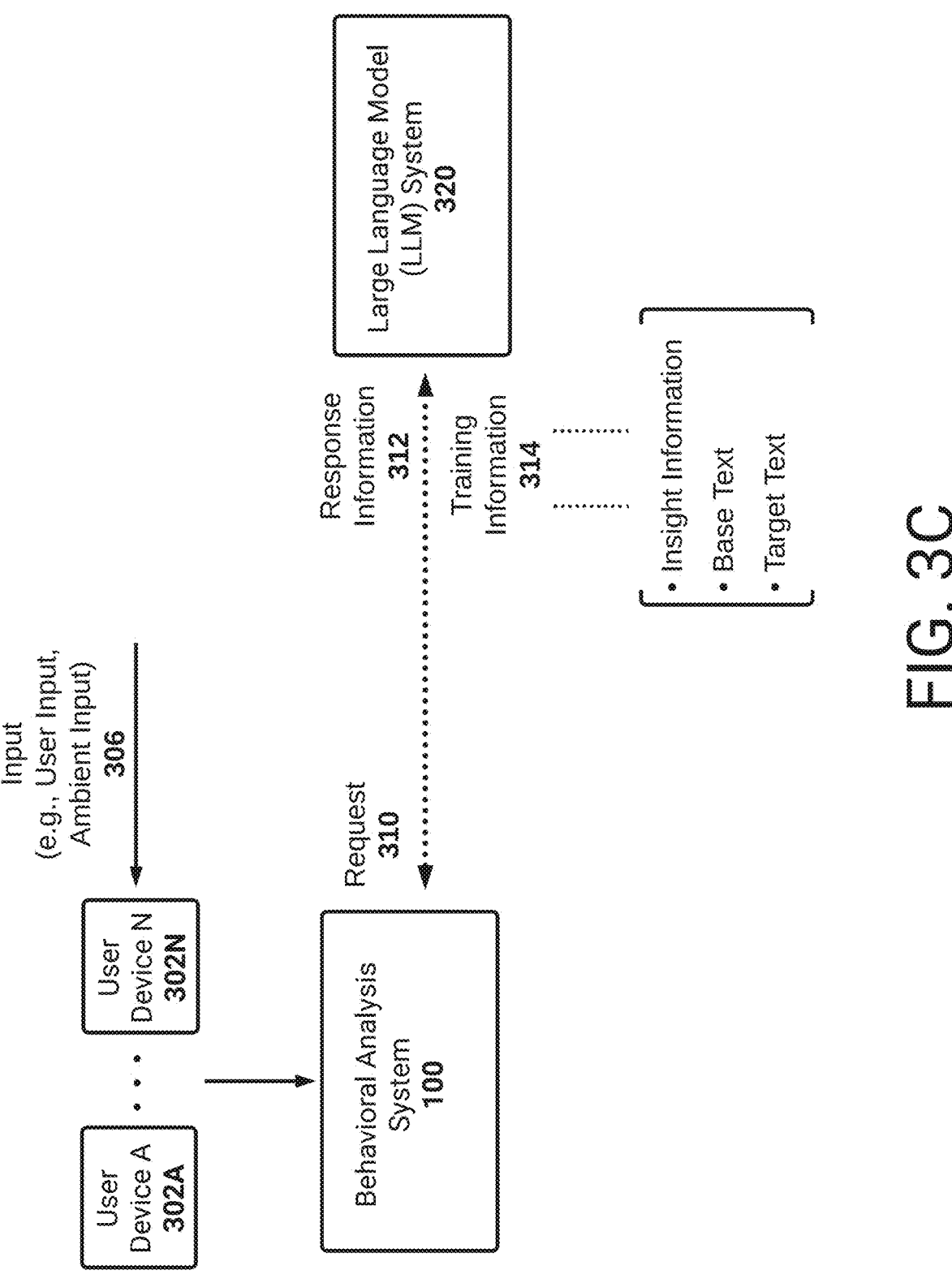
FIG. 3C is a block diagram of an example embodiment in which the example behavioral analysis system is associated with a large language model (LLM).

FIG. 3C is a block diagram of an example embodiment in which the example behavioral analysis system 100 is associated with a large language model (LLM) system 320.

While an LLM is illustrated, as may be appreciated the LLM may represent a multi-modal model or other artificial intelligence (AI) model.

The LLM system 320 may perform inference conditioned on response information 312 from behavioral analysis system 100. For example, and as described herein, the LLM system 320 may request mental state information associated with a user. In this example, the behavioral analysis system 100 may generate response information 312 reflecting, for example, insights associated with the user's mental state. The LLM system 320 may leverage the response information 312 to generate content tailored to the user's present mental condition for delivery the user. In this way, the generated content may more effectively be tailored to the user and provide an enhanced user experience.

To guide generation, LLM system 320 may incorporate the insights into the model's context. In some embodiments, a control preface encodes tone, complexity, length, and pacing instructions derived from response information 312, which are then applied to the subscriber's prompt. For example, when the insights indicate elevated stress and low receptiveness, the model favors brief, low-friction language and fewer follow-ups; when the user is calm and receptive, the model permits more detailed guidance. This conditioning can persist across single-turn or multi-turn exchanges while the validity window remains open.

Style and content may be adapted to avoid patterns likely to increase stress or confusion. Using response information 312, LLM system 320 may simplify vocabulary, break multi-step tasks into smaller units, limit simultaneous choices, or defer optional suggestions until receptiveness improves. When a crowded environment is indicated, outputs can be optimized for quick glances and intermittent attention; when a quiet setting with high receptiveness is indicated, richer alternatives and deeper explanations may be appropriate. The result is practical language and pacing that reflect the immediate context.

Generation need not be text-only. In multi-modal configurations, LLM system 320 can produce audio, images, or video aligned with response information 312. For audio, the model may choose calmer prosody, slower cadence, or softer emphasis under high stress; for visuals, it may favor simpler compositions and less stimulating color palettes. When insights show the user is relaxed and engaged, more detailed visuals or a faster narration style may be used. These adjustments deliver the same core message in a form suited to the current state.

Freshness may be enforced by monitoring the validity interval attached to response information 312. LLM system 320 reduces or removes behavioral conditioning when the interval expires and may use confidence values to modulate outputs, generating conservative language under low confidence or requesting updated context from behavioral analysis system 100 when appropriate. This time-bounded approach helps ensure the content reflects recent conditions rather than stale observations.

Safeguards may also be applied. When response information 312 signals a sensitive context or elevated stress, LLM system 320 avoids humor that could be misread, reduces provocative phrasing, and prefers neutral, supportive language; when stress is below baseline and receptiveness is high, a broader range of tones can be re-enabled. The generated output is returned to the subscriber with optional annotations indicating which insights were applied and any freshness limits, allowing presentation or scheduling in line with privacy, timing, and platform constraints.

In some embodiments, the techniques described herein may be used to inform, or otherwise enhance, training of an LLM. For example, FIG. 3C illustrates a training path in which LLM system 320 is tuned using training information 314. Training information 314 may include insight information that captures, as a few examples, mental state relative to a baseline, environmental context, and/or a receptiveness measure, together with paired examples of base text and target text. The training information 314 may be used to LLM system 320 how to reshape a default response into a preferred response under the same insight conditions, so that future generations match the tone, length, pacing, and structure that historically perform better for similar states. For example, reinforcement learning may be used in some embodiments to train a policy to guide the LLM towards the target text.

Training information 314 can be encoded as model-readable controls. In one arrangement, the insight information is represented as tags or small embedding vectors that indicate attributes such as "stress above baseline," "crowded environment," or "high receptiveness," and that carry confidence and a validity horizon derived from the underlying measurements. These fields condition the model during training and later serve as the same controls during inference, creating a consistent interface between behavioral analysis system 100 and LLM system 320.

For supervised learning, LLM system 320 may be conditioned on the insight information and the base text and is trained to reproduce the target text. Examples may be weighted by outcome signals such as engagement, completion, stress reduction, or user satisfaction, so that revisions associated with better results have greater impact on the loss. Confidence and recency from training information 314 can scale gradients, emphasizing fresh, well-supported interactions and down-weighting stale or low-confidence evidence.

A reinforcement approach may be used as described above. In this configuration, the LLM system 320 may be trained to learn a policy that edits or selects responses given the insight information as state. Actions can include choosing a tone, adjusting verbosity, ordering steps, or deferring optional suggestions. Rewards are computed from downstream outcomes, such as improved engagement when receptiveness is high or reduced stress indicators when crowding is present. Offline policy optimization can be run on logged trajectories, and preference-learning variants can treat base text and target text as comparisons that push the policy toward the preferred alternative under the same state.

Personalization can be introduced without overfitting by structuring the model with lightweight adapters or routing heads. LLM system 320 may maintain small, swappable components keyed to clusters learned elsewhere in the system, allowing the core model to remain stable while adapters capture cohort-specific phrasing or pacing. Training information 314 can include a cluster identifier or other compact profile context so that updates remain modular and reversible.

Privacy may be preserved by constraining what is logged and how it is used. Training information 314 relies on derived indicators rather than raw biometric streams, and examples may be de-identified and aggregated before use. In some embodiments, on-device preprocessing produces the insight information and those abstractions are contributed to the corpus. Safety filters can exclude periods flagged as vulnerable or limit those examples to teaching conservative guardrails rather than general style. Through these mechanisms, LLM system 320 learns to align its outputs with mental state, context, and receptiveness while respecting the data handling constraints of the surrounding platform.

Figure 3D:
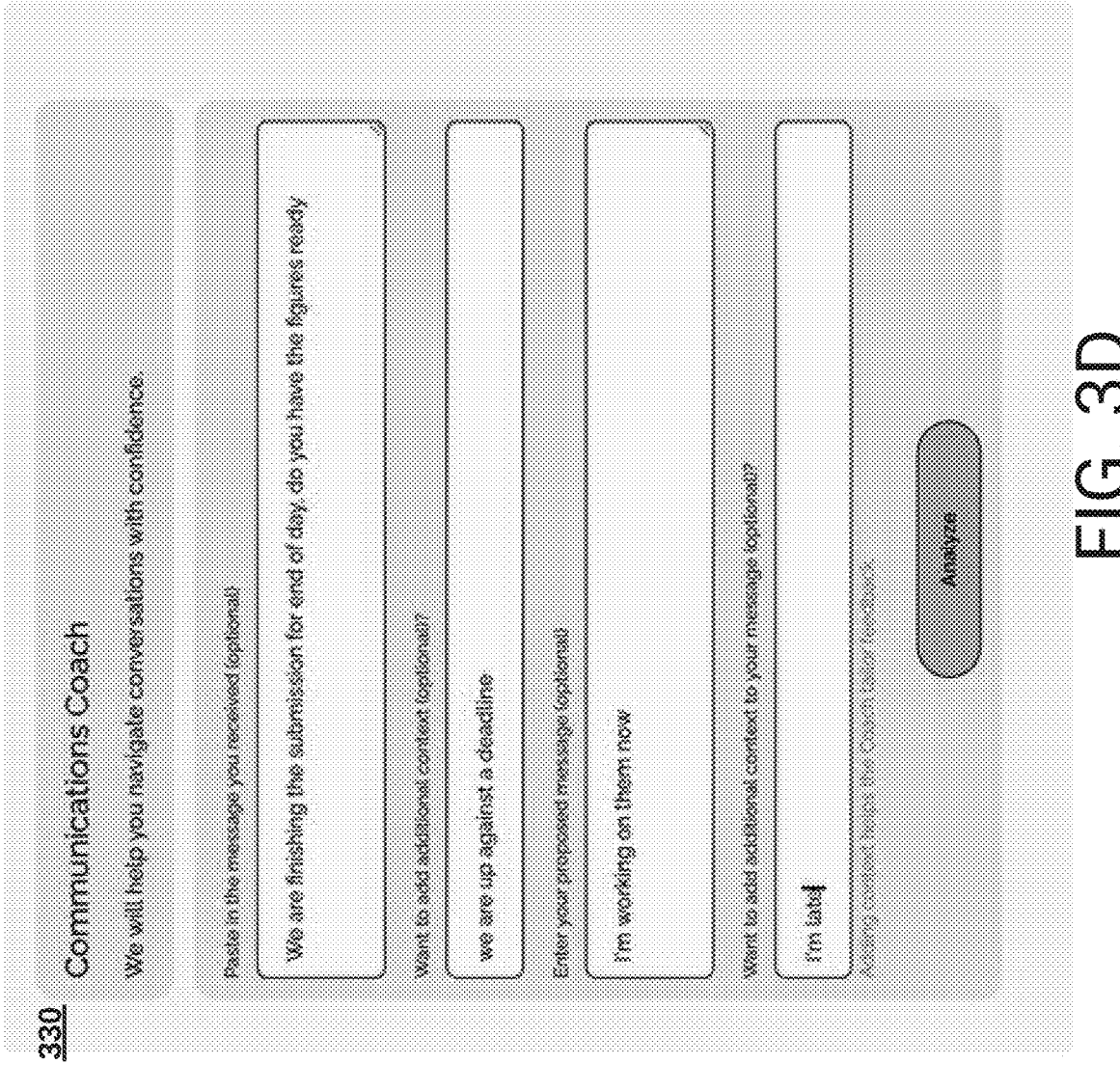
FIG. 3D is an example user interface associated with communication with an LLM or other system.

FIG. 3D is an example user interface 330 associated with communication with an LLM or other system. For example, the user interface 330 may represent a front-end user interface associated with a communication application (e.g., mobile application, web application, point of sale system, and so on) that may leverage, or otherwise be in communication with, an LLM system (e.g., LLM system 320).

In the illustrated example, user interface 330 includes functionality associated with a communications coach. As one example, the communications coach may help users to draft language, respond to language from another person, understand language from another person, and so on. Advantageously, the communications coach may leverage the information described herein (e.g., the user's mental state, such as historical profile optionally with real-time information may be used). While a discrete user interface 330 is shown, as may be appreciated the functionality may be incorporated into other applications or services. For example, an email client may leverage the techniques described herein to adjust language (e.g., text, spoken words) from a user into a form that leverages their mental state.

In FIG. 3D, the user interface 330 includes a portion associated with a message received by a user. For example, the portion requests that the user, "paste in the message you received." In the example, the user indicates that they received a message asking if they have figures ready. In a different portion, the user can add context (e.g., for use by an LLM in understanding the message or any associated back-end context or details). The user can add their proposed message in another portion, for example they indicated they are working on the figures now. The user can similarly add context for their message, and in the example the user has indicated they are late on the figures.

The user can then select an option, for example 'analyze' to trigger an analysis of the information. The LLM system, for example system 320, can receive mental state information associated with the user (e.g., the insights described herein). In some embodiments, the LLM system can receive more fine-grained detail such as information based on the user profile of the user (e.g., historical information). For example, the LLM may receive information derived from questionnaires or other information as described herein:

Profile data, Communications style: Passive 42.3; Aggressive 33.6; Passive-Aggressive 15; Assertive 36

Attachment Style: fearful-avoidant attachment style: 42.86, anxious-preoccupied attachment style: 45.71, secure attachment style: 80.0

Big Five Personality Traits: openness to experience: 67.14, neuroticism: 61.43, conscientiousness: 77.14, extroversion: 67.14, agreeableness: 78.57

Enneagram: dominant_types: type_3_the_achiever_performer: 81.43; type_1_the_reformer_perfectionist: 81.43; type_9_the_peacemaker_mediator: 81.43 wing_types: Myers-Briggs Type Indicator: type: ENFP; type_scores: extroverts: 52.0, intuitives: 72.0, feelers: 75.79, perceivers: 63.75, :ove Languages: (if messages are with a romantic partner) primary_love_languages: Acts of Servic, secondary_love_languages: Words of Affirmation In some embodiments, the LLM may receive at least a subset of the information above. The LLM may additionally, or alternatively, receive insights such as personality traits or types (e.g., derived from the above or additional information). The LLM can additionally receive information derived from real-time information, such as deviations from the personality traits or types, whether the user is stressed, whether they are proximate to other users (e.g., the user may be near his/her superior when interacting with the tool), and so on.

Figure 3E:
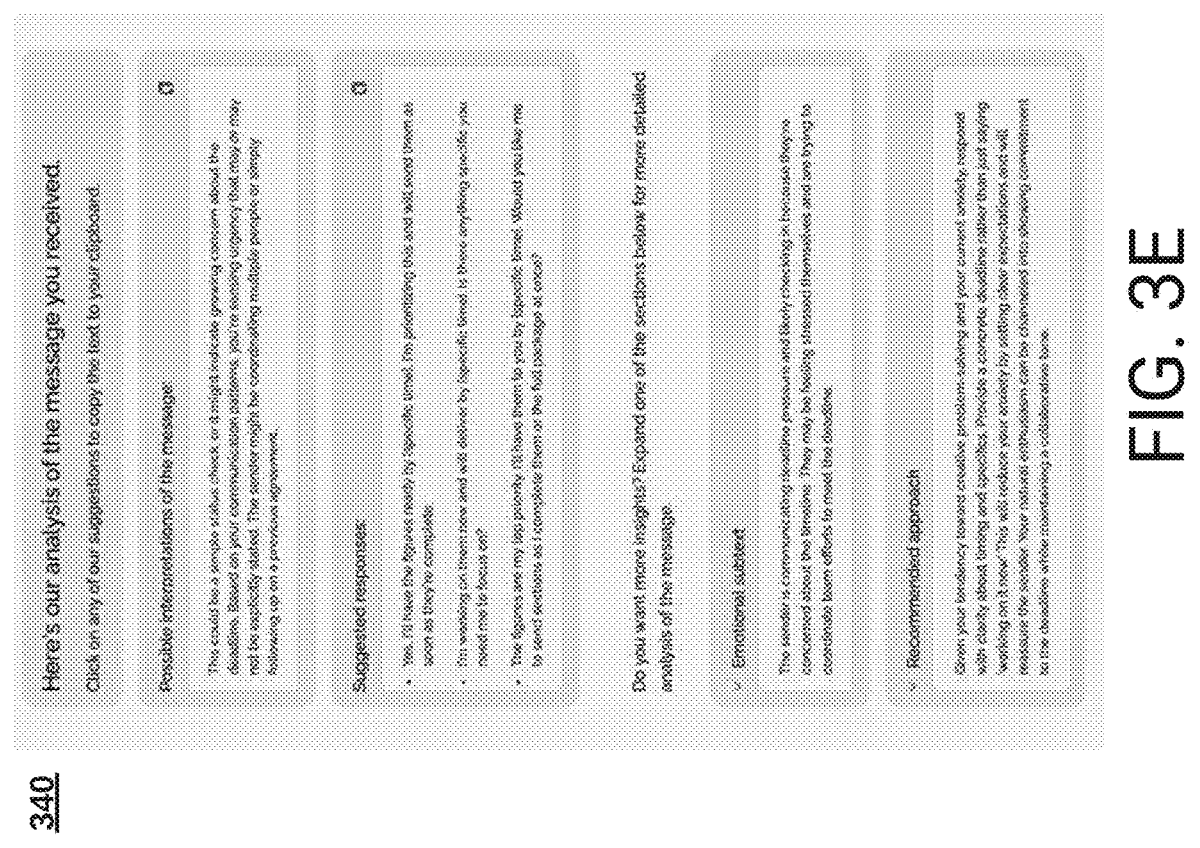

FIG. 3E is another example user interface 340 associated with communication with an LLM or other system. In the illustrated example, the LLM has output possible interpretations of the message. The LLM has additionally suggested responses based, at least in part, on the information provided via FIG. 3D. The LLM may additionally based its responses on the mental state information associated with the user. For example, the LLM may access, or receive insights extracted from, the user's user profile. As another example, the LLM may access, or receive insights extracted from, the user's real-time information.

In FIG. 3E, there is output in a portion labeled 'Emotional subtext.' This portion includes information for use by the user in understanding the message the user received. In some embodiments, the LLM or system described herein may have a user profile, and optionally real-time information, for the person who sent the message to which the user is trying to respond. For example, the person may be another user of the system. In this example, the system may thus similarly access user profile for that user to understand his/her mental state. This may inform whether that user is presently stressed above a normal baseline and may also help inform the user's personality traits/mental state as described herein.

The user interface 340 further includes a recommended approach. For example, it notes that the user has a tendency towards creative problem-solving. This may be derived from the user's user profile, for example based on responses to questionnaires, historical information of the user, clustering, and so on as described herein. The recommended approach further indicates that the user currently has anxiety, which may be based on the real-time information described herein (e.g., user input habits within a window, biometrics, and so on). Thus, the recommended approach includes information tailored to the user as determined via the LLM based on the information described herein (e.g., mental state information).

In certain embodiments, the disclosed technology uses structured personality profile data as direct input to a large language model system (e.g., system 320) operating under defined inference guidelines. The guidelines may instruct the model to perform personality-aware communication optimization at the level of an individual message so that analyses and recommendations are standardized across use cases. The objectives of the guidelines may include extracting relevant communication patterns without explicit rule programming, predicting partner-specific intent and likely reactions when a counterpart profile is available, identifying user blind spots in communication skills and patterns, and generating personalized recommendations tailored to the individual's current emotional and mental state while accounting for the individual's established communication tendencies.

The communication optimization workflow, such as those described in FIGS. 3C-3D, accepts multiple inputs that condition model behavior. Inputs may include the communication context, such as received message content and an optional proposed response; the user's stated intent or desired outcome and target tone; and structured personality assessment data for the message composer and, when available, for the communication partner. Additional inputs may reflect real-time indicators of mental or emotional state derived from device sensors and interaction signals within a defined window, while raw biometric measurements can remain restricted to the device with derived metrics provided to the system. A user profile aggregates the historical and real-time information and may be clustered within a multi-dimensional feature space to support adaptive guidance and baselining.

The structured personality profile data can encompass attachment-style measurements, derived biometric indicators of stress or its absence, trait-based personality scores across multiple dimensions, motivational typologies, cognitive-behavioral preferences, historical life-experience factors, and communication preference indicators. The data may be normalized into a machine-readable schema and passed directly to the large language model system as part of a controlled prompt specification. By supplying psychometric structure rather than hand-coded rules, the model is configured to infer personality dynamics, synthesize cross-profile interactions, and produce standardized outputs without bespoke rule sets.

When analyzing an incoming message, the system decodes emotional subtext beyond literal content, identifies underlying needs and concerns of the sender, evaluates urgency based on communication patterns, and generates multiple plausible interpretations to capture ambiguity. Each interpretation may be associated with a measure of confidence and with predicted near-term reactions by the counterpart, which can be used to shape response strategies. This analysis provides message-level personalization rather than generic tips.

When evaluating a proposed response, the system assesses the risk level of the communication, predicts the recipient's likely reaction based on the recipient's personality configuration, and measures alignment between the user's stated intent and the actual tone and content of the draft. The model highlights potential relationship impacts, flags tone or commitment mismatches, and recommends concrete edits. Recommendations are framed to preserve the user's authentic style while improving the probability of a favorable reception.

If one profile is known, the system provides one-directional optimization by predicting how others may interpret the message and tailoring suggestions accordingly. When both profiles are known, the system performs real-time bilateral analysis that optimizes guidance for both parties simultaneously. The model conducts dynamic compatibility mapping of the specific pairing, identifies friction points and complementary traits, and calculates translation requirements across differing styles so that suggested approaches bridge the gap between profiles.

Blind-spot identification may be, for example, one capability. By conditioning on the sender's structured user profile, real-time information, recent context, and so on, the system predicts where the sender's natural tendencies may lead to misinterpretations or counterproductive phrasing. The system explains the underlying pattern in neutral terms and offers alternatives framed as best practices. Over time, these explanations function as skills coaching that generalizes across conversations while remaining personalized to the user's profile.

As one example, when a user's profile indicates high analytical orientation with low emotional expressiveness and the partner's profile indicates a high need for emotional validation, the system detects the mismatch and recommends augmenting an analytical draft with explicit acknowledgment and reassurance. The recommendation includes rationale tied to the counterpart's needs and a forecast that the unadjusted message may be received negatively. In this way, the system delivers concrete message-level edits that are both authentic to the user and effective for the recipient.

The system further improves through a learning cycle in which outcomes from exchanges between defined individuals are observed and fed back into profile maintenance. Signals such as which suggestions were adopted, whether edits were made, and subsequent indicators of receptiveness or stress relative to baseline can be used to refine clustering positions and to adjust prompting guidelines. The approach also adapts to context domains, increasing familiarity cues when the counterpart is identified as a romantic partner and adopting more formal tone guidance in professional contexts. Throughout, the design avoids explicit rule programming by leveraging structured psychometric inputs and standardized objectives to guide the large language model system toward consistent, personality-aware optimization.

Figure 4:
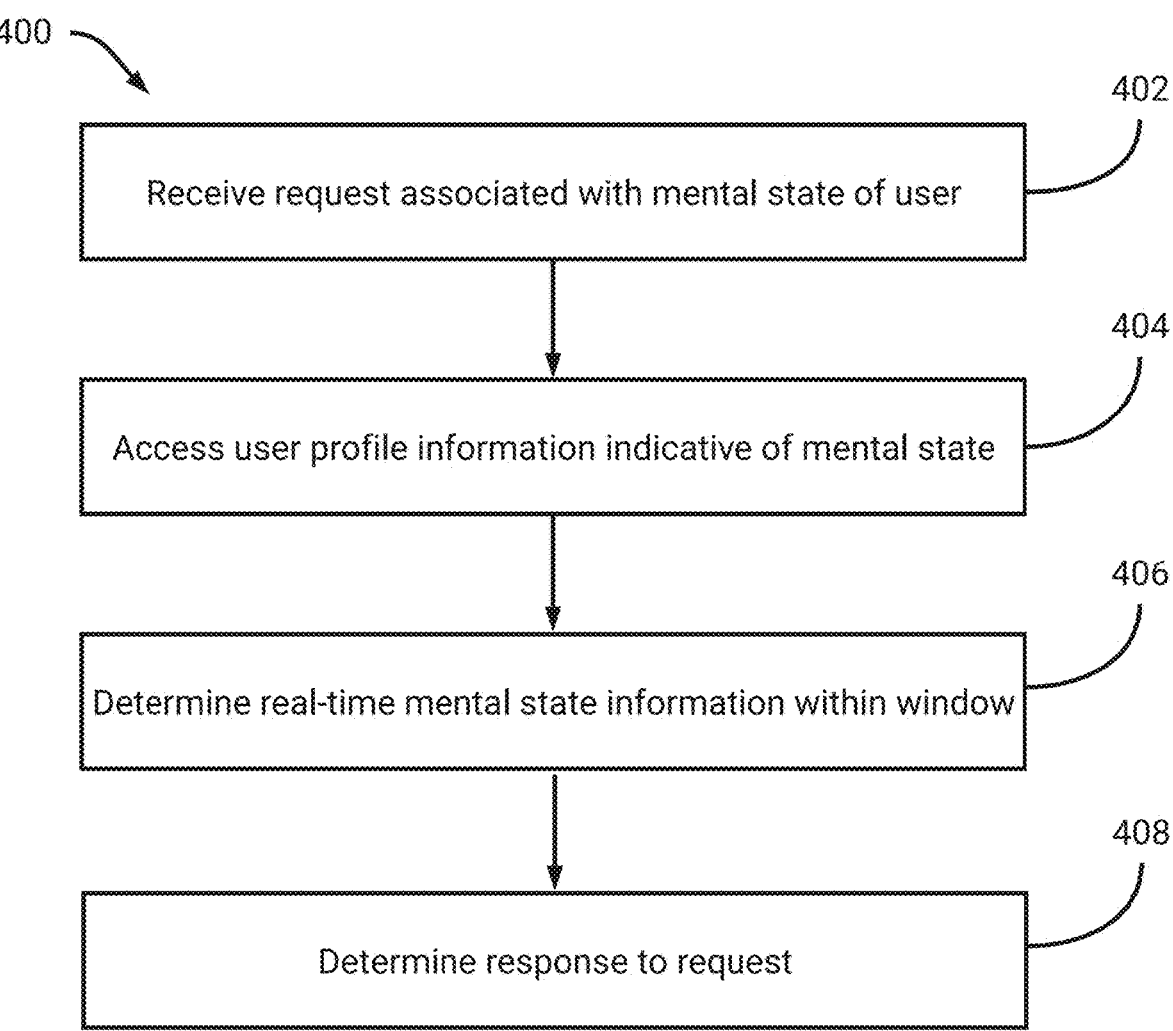
FIG. 4 is a flowchart of an example process for responding to a subscriber request based on user profile and mental state information associated with a user.

FIG. 4 is a flowchart of an example process 400 for determining a response based on a user profile associated with a mental state of a user. For convenience, the process 400 will be described as being performed by a system of one or more processors or computers (e.g., a user device, a cloud system, and so on).

At block 402, the system receives a request associated with a user's mental state from a subscriber. The subscriber may be the back-end of an application or web service executing on a user device of the user. The subscriber may additionally reflect an application or web service associated with an external system utilized by the user (e.g., the user's vehicle, a point-of-sale system, and so on as described herein).

In some embodiments, the request may identify the user via a pseudonymous token. The request may optionally specify the insight types sought (for example, stress level, environmental context, and/or receptiveness) and optionally include timing constraints such as a freshness target or threshold collection window. The request can also carry optional decision context, such as candidate content items for selection, a proposed route segment for evaluation, or a presentation mode that will consume the resulting insights.

At block 404, the system accesses user profile information indicative of mental state. The system may access the user profile which may include or be associated with the model. The system may generate the user profile using techniques described herein or other techniques known by those skilled in the art.

As one example, the system may access historical usage/activity patterns. This may reflect the user/s baseline for behaviors/decisions the user makes. This information may be quantified as the user's baseline state. Pattern matching may be used optionally along with Gaussian and/or Bayesian algorithms.

The system may also determine the user's personality as defined through a series of calculations based on the data captured by any or all of a plethora of personality tests (partial or complete) as well as psychological profile tests and assessments. For example, the user may have filled in a MBTI test and parts of an Enneagram through online quizzes that feed us back data that allows us to establish a baseline of the user's personality. Each subsequent interaction confirms or contradicts the assessment data, altering the user's score. (this is a continuously recalculating/reaffirming algorithmic process).

The system may thus create, in some embodiments, a multi-dimensional personality score; an XY defined score that represents a combination of personality tests overlaid onto a Z axis that considers the user's ACE score factors (types of abuse, traumas, and state (e.g., whether the user has addressed them or not via counselling or otherwise).

At block 406, the system may also access real-time information within a window. For example, the system may access sensor data, such as biometric information, for example collected from the user's watch, phone, car sensors, and so on, which helps to create a baseline for the user's normal state and which provides the system with real-time data as to aberrations from a normal mood.

The system may use the above-described information to map the user's behavior to predict normal decisions/wants/ and so on when faced with choices. The system may use the above-described information to determine that there's an aberration occurring in the user's normal state, for example in response to current or new information, and to consider possible suggestions based Historical baselines.

For example, when presented with a scenario (e.g., the user is going for coffee with a friend example); the above-described information may lead a subscriber to recommend a coffee shop that is busy/quiet/nearby/close/and soon, and once there, the system may recommend a product offering that meets the user's current mood.

The system may validate expectations of decisions the user makes against the user's historical norms. The system may generate a message proactively suggesting a coffee shop and provide a discount/coupon, for example based on the above-described information. As an example, the user may encounter an associate. I this way, the system may learn that if the user encounters someone who triggers a particular response (e.g., sensors alone or other of the above-described information), there is a greater likelihood that the user will be susceptible to an offer. Similarly, the system may analyze the user's susceptivity to an offer when alone.

At block 408, the system responds to the request. The system may respond to the request based on the user profile. The system may also obtain current information associated with the user, such as information within a threshold time period (e.g., 30 minutes, 10 minutes, 1 minute). Example information may include location, biometrics, interactions with devices, calendared events, navigation information, and so on.

Figure 5:
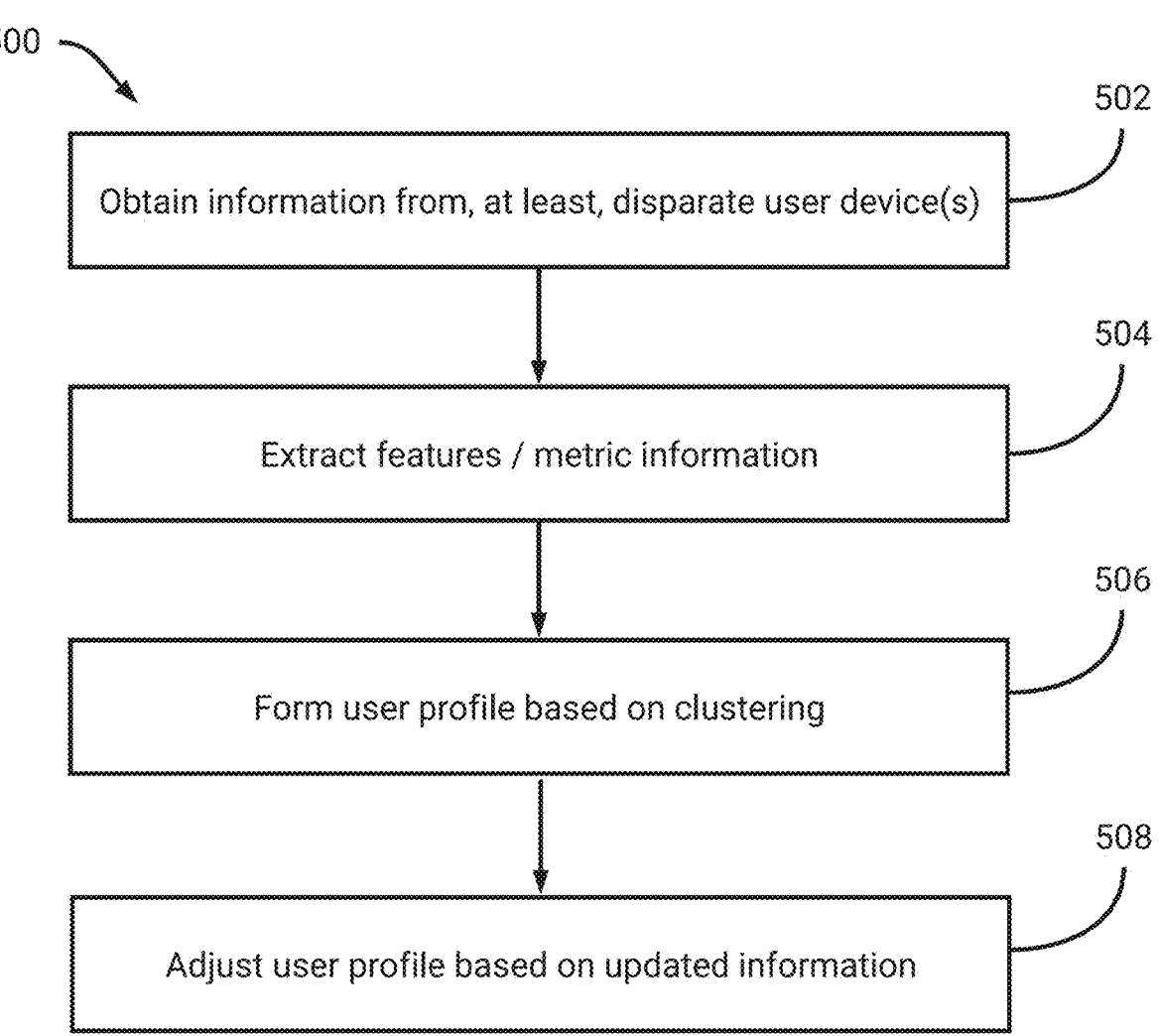
FIG. 5 is a flowchart of an example process for forming a user profile associated with a user.

FIG. 5 is a flowchart of an example process 500 for forming a user profile associated with a user. For convenience, the process 500 will be described as being performed by a system of one or more processors or computers (e.g., a user device, a cloud system, and so on).

At block 502, the system obtains information from, at least, disparate user devices associated with the user. The information can include historical sources such as questionnaire responses, personality and psychological assessments, activity histories, and online behavior. Real-time information may also be included within a threshold window, such as location, calendared events, interaction measures on a device, and/or a measure of persons proximate to the user derived from wireless sensing. In some embodiments, external information, such as via a vehicle, may include eye-tracking indicators or speech-derived metrics. In certain deployments, raw biometric streams may remain on the user device, and the system receives processed indicators or periodic values, consistent with device-side privacy controls.

At block 504, the system extracts features and metric information from the collected data. The extraction can normalize heterogeneous inputs and express them as a vector of features suitable for comparison, including biometric-derived indicators relative to a personal baseline, interaction dynamics, assessment-derived trait factors, and environmental context such as crowding and location. Feature formation may use neural networks or clustering techniques to learn representations in a multi-dimensional space, and may attach quality, recency, and baseline-delta values so later stages can account for evidence strength and temporal freshness during analysis.

At block 506, the system forms the user profile based on clustering. In one arrangement, the feature vector is positioned within a learned behavioral space so the user can be compared consistently with other users. Similarity metrics such as Euclidean distance or cosine similarity may be used to establish proximity, and cohort formation may rely on k-means, hierarchical clustering, or density-based methods. The resulting placement and neighborhood relationships provide a foundation for downstream analysis and response generation that leverage both individual traits and similarity to others.

At block 508, the system adjusts the user profile based on updated information. As new evidence arrives, the system refines baselines, incorporates validated patterns discovered during operation, and, when warranted, re-places the profile within a learned behavioral space so neighborhood relationships reflect current behavior. Event-driven updates may propagate related adjustments to affected neighbors, and temporal weighting favors recent, high-quality observations over stale or low-confidence data. Thus, the profile evolves over time to preserve currency for later use when responding to subscriber requests.

At block 508, for example after determining a response as described in FIG. 4, the system records the real-time snapshot, the request context, and the response that was issued as an episodic trace linked to the user profile. Each trace may include timestamps, signal-quality measures, and/or insight confidence. The system may, in some embodiments, apply temporal decay to older traces and prioritizes higher-quality evidence so future requests compare against the most reliable, recent observations. When subsequent behavior confirms the effect of an issued response, the system marks the trace as validated; if outcomes indicate the response was not helpful, the trace is down-weighted or flagged for exclusion from future decisions.

When sufficient validated evidence accumulates, the system promotes information from episodic traces into durable portions of the profile. Baselines for biometric and interaction features are adjusted, feature weights are rebalanced, and the profile's vector representation is re-computed so similarity scores and neighbor sets reflect current patterns. The system may also register stable triggers and mitigations, such as locations or situations that reliably raise or reduce stress, and it updates any cached profile on a user device, so local components operate with the most recent view. These updates keep the profile current while preserving privacy by relying on processed indicators and incorporating evidence that meets recency and confidence thresholds.

At block 508, the foregoing adjustments may be performed centrally, on device, or in a hybrid arrangement that splits computation across device and service boundaries. In each case, permitted signals are obtained, features are extracted, the profile is positioned by clustering, and incremental updates refine the profile as additional information becomes available, enabling accurate, privacy-preserving modeling over the user's lifecycle.

OTHER EMBODIMENTS

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and engines described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A method implemented by a system of one or more computers, the method comprising:

receiving, via the system, a request associated with a user, the request being received from a subscriber system of a plurality of subscriber systems, wherein an individual subscriber system is associated with a back-end of a first application or web service executing on a user device of one or more user devices associated with the user, and wherein the request is indicative of a request for behavioral response information;

accessing a user profile indicative of the user's mental state, the user profile aggregating disparate historical information associated with the user, and the user profile being associated with a multi-dimensional feature vector clustered within a learned multi-dimensional feature space;

triggering aggregation of real-time information within a threshold window of time, the real-time information being obtained, at least, via a second application executing on the user device, the second application analyzing data derived from sensors and/or user interactions with the user device, the second application forming the real-time information based on the analyses, wherein the second application is triggered, by the system, to transform raw sensor data from the sensors into insights extracted from the raw sensor data, the raw sensor data reflecting sensitive information associated with the user including biometric data, wherein the user device is restricted from transmitting the raw sensor data, and wherein, the system, iteratively refines the learned multi-dimensional feature space via promoting the real-time information into a durable portion of the user profile and re-calculates similarity computations for, at least, a cohort of behaviorally proximate neighbors based on the durable portion; and responding to the request based on the user profile and real-time information, the response being formed using one or more machine learning models, and wherein the response is configured to inform presentation of information via the first application or web service.

2. The method claim 1, wherein the real-time information is indicative of a measure of persons proximate to the user, the measure being based on wireless information from wireless sensors proximate to the user.

3. The method of claim 1, wherein aggregating real-time information includes:

causing communications between the second application and a separate system proximate to the user, the separate system being included in a vehicle of the user, and the communications reflecting operation information associated with the vehicle, wherein information included in, or derived from, the communications is received via the system.

4. The method of claim 3, wherein operation information associated with the vehicle includes eye-tracking information or verbal speech metrics associated with speech of the user.

5. The method of claim 1, wherein the user interactions with the user device indicate measures associated with user input, and wherein the user input includes one or more of touch screen input, speech input, keyboard input, or interactions with software executing on the user device.

6. The method of claim 1, wherein the real-time information indicates calendared events and/or user location.

7. The method of claim 1, wherein responding to the request comprises:

determining one or more insights extracted from the user profile and the real-time information, wherein an individual insight reflects one or more of a stress level, information indicative environmental context, or a measure indicative of receptiveness.

8. The method of claim 7, wherein the information indicative of environmental context reflects a location of the user device, a measure of persons proximate to the user device, or known user devices of other users who are proximate to the user device.

9. The method of claim 1, wherein responding to the request comprises:

identifying, based on the user profile and the real-time information, a content item of a plurality of content items; and causing presentation of the identified content item via the first application, wherein the system routes the content item to the subscriber system for inclusion in the first application.

10. The method of claim 1, wherein the subscriber system is associated with navigation, and wherein the responding to the request comprises instructing the subscriber system to adjust a route generated via the subscriber system.

11. The method of claim 1, wherein historical information includes one or more of biometric information, user responses to questionnaires, user responses to personality profiles and/or psychological assessment tests, ACE questionnaires, Enneagrams, attachment styles assessments, user reactions to activities and/or prompts, psychological profiling, psychological history, family history, history of associates, online activities.

12. The method of claim 1, wherein the response indicates the user is stressed above a baseline.

13. The method of claim 1, wherein the response indicates the user is less stressed than a baseline.

14. The method of claim 1, wherein the user profile is adjusted or refined over time based on new information associated with the user.

15. A system comprising one or more processors and non-transitory computer storage media storing instructions that when executed by the one or more processors, cause the one or more processors to perform operations comprising:

receiving, via the system, a request associated with a user, the request being received from a subscriber system of a plurality of subscriber systems, wherein an individual subscriber system is associated with a back-end of a first application or web service executing on a user device of one or more user devices associated with the user, and wherein the request is indicative of a request for behavioral response information;

accessing a user profile indicative of the user's mental state, the user profile aggregating disparate historical information associated with the user, and the user profile being associated with a multi-dimensional feature vector clustered within a learned multi-dimensional feature space;

triggering aggregation of real-time information within a threshold window of time, the real-time information being obtained, at least, via a second application executing on the user device, the second application analyzing data derived from sensors and/or user interactions with the user device, the second application forming the real-time information based on the analyses, wherein the second application is triggered, by the system, to transform raw sensor data from the sensors into insights extracted from the raw sensor data, the raw sensor data reflecting sensitive information associated with the user including biometric data, wherein the user device is restricted from transmitting the raw sensor data, and wherein, the system, iteratively refines the learned multi-dimensional feature space via promoting the real-time information into a durable portion of the user profile and re-calculates similarity computations for, at least, a cohort of behaviorally proximate neighbors based on the durable portion; and responding to the request based on the user profile and real-time information, the response being formed using one or more machine learning models, and wherein the response is configured to inform presentation of information via the first application or web service.

16. The system of claim 15, wherein the real-time information is indicative of a measure of persons proximate to the user, the measure being based on wireless information from wireless sensors proximate to the user.

17. The system of claim 15, wherein aggregating real-time information includes:

causing communications between the second application and a separate system proximate to the user, the separate system being included in a vehicle of the user, and the communications reflecting operation information associated with the vehicle, wherein information included in, or derived from, the communications is received via the system.

18. The system of claim 15, wherein responding to the request comprises:

determining one or more insights extracted from the user profile and the real-time information, wherein an individual insight reflects one or more of a stress level, information indicative environmental context, or a measure indicative of receptiveness.

19. A method performed by one or more processors of a user device associated with a user, the method comprising:

receiving, at the user device via an operating-system mediated interface, a request associated with the user, the request being received from a subscriber component associated with a client application executing on the user device or from a back-end associated with the client application, the request being indicative of behavioral response information;

accessing, at the user device, a user profile indicative of the user's mental state, the user profile aggregating disparate historical information associated with the user and being positioned, via a multi-dimensional feature vector, within a learned multi-dimensional feature space;

triggering, at the user device, aggregation of real-time information within a threshold window of time, the real-time information being obtained via operating-system services by a second application or library executing on the user device that analyzes data derived from sensors and/or user interactions with the user device and forms the real-time information based on the analyses, wherein the second application transforms raw sensor data from the sensors into insights extracted from the raw sensor data, the raw sensor data reflecting sensitive information associated with the user including biometric data, wherein the user device is restricted from transmitting the raw sensor data, and wherein the learned multi-dimensional feature space is iteratively refined via promoting the real-time information into a durable portion of the user profile and similarity computations for, at least, a cohort of behaviorally proximate neighbors are re-calculated based on the durable portion;

and responding to the request by generating, on the user device, a response based on the user profile and the real-time information, the response being configured to inform presentation of information via the client application, and the response being formed using one or more machine learning models, wherein the response is routed to the client application or to the back-end associated with the client application.

20. The method of claim 19, wherein the real-time information includes a measure of persons proximate to the user derived from wireless information exposed by operating-system services.

21. The method of claim 19, further comprising receiving, at the user device over a secured pairing, summarized metrics or insights from a companion wearable device, and incorporating the summarized metrics or insights into the real-time information.

22. The method of claim 19, wherein data derived from sensors includes biometrics reflecting at least a stress response, and wherein raw biometric information remains restricted to the user device and is not transmitted off the device.

* * * * *